(12) United States Patent
Kamiya et al.

(10) Patent No.: US 11,738,264 B2
(45) Date of Patent: Aug. 29, 2023

(54) STORAGE MEDIUM, GAME SYSTEM, GAME APPARATUS AND GAME CONTROL METHOD

(71) Applicant: NINTENDO CO., LTD., Kyoto (JP)

(72) Inventors: Hideki Kamiya, Osaka (JP); Yusuke Miyata, Osaka (JP)

(73) Assignee: Nintendo Co., Ltd., Kyoto (JP)

( * ) Notice: Subject to any disclaimer, the term of this patent is extended or adjusted under 35 U.S.C. 154(b) by 96 days.

(21) Appl. No.: 17/647,528

(22) Filed: Jan. 10, 2022

(65) Prior Publication Data

US 2022/0297005 A1   Sep. 22, 2022

(30) Foreign Application Priority Data

Mar. 22, 2021 (JP) ................................ 2021-046839

(51) Int. Cl.
*A63F 13/525* (2014.01)
*A63F 13/80* (2014.01)
*A63F 13/44* (2014.01)
*A63F 13/42* (2014.01)

(52) U.S. Cl.
CPC ............ *A63F 13/525* (2014.09); *A63F 13/42* (2014.09); *A63F 13/44* (2014.09); *A63F 13/80* (2014.09)

(58) Field of Classification Search
CPC .......... A63F 13/42; A63F 13/44; A63F 13/50; A63F 13/52; A63F 13/525; A63F 13/80
See application file for complete search history.

(56) References Cited

U.S. PATENT DOCUMENTS

| | | | |
|---|---|---|---|
| 10,610,782 B2 * | 4/2020 | Motokura | A63F 13/537 |
| 11,577,157 B2 * | 2/2023 | Konishi | A63F 13/573 |
| 2020/0254335 A1 | 8/2020 | Taura et al. | |
| 2020/0368622 A1 * | 11/2020 | Kando | A63F 13/525 |
| 2021/0354036 A1 * | 11/2021 | Swann | G06T 15/04 |

FOREIGN PATENT DOCUMENTS

JP     2020-130213     8/2020

\* cited by examiner

*Primary Examiner* — Omkar A Deodhar
(74) *Attorney, Agent, or Firm* — Nixon & Vanderhye PC

(57) ABSTRACT

A non-limiting example game system includes a main body apparatus, and this main body apparatus is provided attachably and detachably with a left controller and a right controller. In a first operation mode, a movement and an action of a player character are controlled according to an operation of a player. In a second operation mode, an offensive character is made to appear, and a movement and an action of the offensive character are controlled according to an operation of the player. Therefore, the movement of the player character is restricted in the second operation mode. A direction and a position of a virtual camera are controlled so as to follow the player character in the first operation mode and to respectively capture the player character and the offensive character in the second operation mode.

26 Claims, 27 Drawing Sheets

GAME SCREEN (FIRST OPERATION MODE) 200

GAME SCREEN (SECOND OPERATION MODE) 200

GAME SCREEN (SECOND OPERATION MODE) 200

STORAGE MEDIUM, GAME SYSTEM, GAME APPARATUS AND GAME CONTROL METHOD

CROSS REFERENCE OF RELATED APPLICATION

This application claims a priority to Japanese Patent Application No. 2021-46839 filed on Mar. 22, 2021, and the entire contents of which are incorporated herein by reference.

FIELD

This application describes a storage medium, a game system, a game apparatus and a game control method, and more specifically, a storage medium, a game system, a game apparatus and a game control method, in which a player character object or an offensive character object is controlled according to an operation of a player.

SUMMARY

It is a principal object of an embodiment(s) to provide a novel storage medium, game system, game apparatus and game control method.

Moreover, it is another object of the embodiment(s) to provide a storage medium, game system, game apparatus and game control method, capable of operating two characters with a new method.

A first embodiment is a non-transitory computer-readable storage medium storing a game program executable by a computer provided with one or more processors, wherein the game program causes the one or more processors to execute: in a first operation mode, controlling a movement and an action of a player character object in a virtual space based on an operation input; setting positions of a viewpoint and a look-at-point of a virtual camera based on a position of the player character object; and making an offensive character object appear in the virtual space and changing an operation mode to a second operation mode based on a first changing instruction input, and in the second operation mode, restricting the movement of the player character object; controlling a movement and an action of the offensive character object in the virtual space based on an operation input; setting the position of the look-at-point of the virtual camera based on a position of the player character object and setting the position of the viewpoint of the virtual camera so that a line of sight of the virtual camera follows a position of the offensive character object; and changing the operation mode to the first operation mode based on a second changing instruction input.

According to the first embodiment, in the first operation mode, the player character object is followed by the virtual camera, and the movement and the action of the player character object are controlled, and in the second operation mode, the position of the look-at-point is set based on the position of the player character object of which the movement is restricted, and the position of the viewpoint of the virtual camera is set so that the position of the offensive character object is followed by the line of sight of the virtual camera, and therefore, it is possible to operate the player character object and the offensive character object while changing them and to control the virtual camera so that both of character objects come into a field of view. That is, it is possible to operate the two character objects with a new method.

A second embodiment is the storage medium according to the first embodiment, wherein the game program causes the one or more processors to execute: in the second operation mode, making the offensive character object execute a designated action that is designated based on an operation input; changing the operation mode to the first operation mode and deleting the offensive character object when the second changing instruction input is performed; and deleting the offensive character object when completing the designated action after the operation mode is changed to the first operation mode if the designated action has not been completed by the offensive character object when the second changing instruction input is performed.

According to the second embodiment, since the offensive character object is deleted after completing the designated action of the offensive character object even if the operation mode is changed from the second operation mode to the first operation mode, it is possible to temporarily make the player character object and the offensive character object perform actions simultaneously.

A third embodiment is the storage medium according to the second embodiment, wherein the game program causes the one or more processors to execute: in the second operation mode, when an action is further designated based on an operation input during when the offensive character object is performing a first action having been designated, holding such a designated action as a second action; making the offensive character object perform the second action after completion of the first action; and deleting the offensive character object when completing all the designated actions being designated after the operation mode is changed to the first operation mode if at least one of the designated actions is not completed by the offensive character object when the second changing instruction input is performed.

According to the third embodiment, since the offensive character object is deleted after completion of all the action while holding the designation of designated action even when the operation mode is changed to the first operation mode, it is possible to temporarily make the player character object and the offensive character object perform actions simultaneously, and thus, to prolong a period of time that both character objects can perform the actions simultaneously.

A fourth embodiment is the storage medium according to the first embodiment, wherein the game program causes the one or more processors to execute: in the first operation mode, making the player character object perform a designated action that is designated based on an operation input; and making the player character object perform the designated action until completing the designated action after the operation mode is changed to the second operation mode if the player character object has not completed the designated action when the first changing instruction input is performed.

According to the fourth embodiment, it is also possible to make the player character object and the offensive character object perform simultaneously actions, temporarily.

A fifth embodiment is the storage medium according to the first embodiment, wherein the game program causes the one or more processors to execute: controlling an enemy character object in the virtual space; in the second operation mode, deleting the offensive character object when the player character object receives an attack of the enemy character object in the second operation mode, and changing the operation mode to the first operation mode.

According to the fifth embodiment, in a specification that the offensive character object is deleted if the player character object receives an attack, it is possible to operate the offensive character object while grasping whether the player character object is likely to receive the attack of the enemy character object by controlling the virtual camera so that both the character objects come into a field of view.

A sixth embodiment is the storage medium according to the fifth embodiment, wherein the game program causes the one or more processors to execute: in the second operation mode, setting the position of the viewpoint of the virtual camera so that the line of sight of the virtual camera follows a position of the enemy character object or a position between the offensive character object and the enemy character object.

According to the sixth embodiment, since the virtual camera is controlled so as to capture the enemy character object, it is possible to grasp whether the player character object is likely to receive the attack of the enemy character object.

A seventh embodiment is the storage medium according to the first embodiment, wherein the game program causes the one or more processors to execute: changing temporarily the line of sight of the virtual camera based on an operation input.

According to the seventh embodiment, it is possible to see surroundings by changing a direction of the virtual camera temporarily, and then, to return to camera control that an effect of this embodiment can be obtained.

An eighth embodiment is the storage medium according to the first embodiment, wherein the game program causes the one or more processors to execute: performing the first operation changing instruction input when a predetermined key input is changed to an on state from an off state, performing the second operation changing instruction input when the predetermined key input is changed to the off state from the on state, and making the operation mode continue the second operation mode during a time that the on state of the predetermined key input is continued.

According to the eighth embodiment, since the operation mode becomes the second operation mode during a time that the on state of the predetermined key input is continued, it is possible for a player to easily know he/she is operating which one when both the player character object and the offensive character object appear.

A ninth embodiment is a game system provided with an operation device and a game apparatus including one or more processors, wherein the one of more processors execute: in a first operation mode, controlling a movement and an action of a player character object in a virtual space based on an operation input to the operation device; setting positions of a viewpoint and a look-at-point of a virtual camera based on a position of the player character object; and making an offensive character object appear in the virtual space and changing an operation mode to a second operation mode based on a first changing instruction input to the operation device, and in the second operation mode, restricting the movement of the player character object; controlling a movement and an action of the offensive character object in the virtual space based on an operation input to the operation device; setting the position of the look-at-point of the virtual camera based on a position of the player character object and setting the position of the viewpoint of the virtual camera so that a line of sight of the virtual camera follows a position of the offensive character object; and changing the operation mode to the first operation mode based on a second changing instruction input to the operation device.

A tenth embodiment is a game apparatus provided with an operation device and one or more processors, wherein the one or more processors execute: in a first operation mode, controlling a movement and an action of a player character object in a virtual space based on an operation input to the operation device; setting positions of a viewpoint and a look-at-point of a virtual camera based on a position of the player character object; and making an offensive character object appear in the virtual space and changing an operation mode to a second operation mode based on a first changing instruction input to the operation device, and in the second operation mode, restricting the movement of the player character object; controlling a movement and an action of the offensive character object in the virtual space based on an operation input to the operation device; setting the position of the look-at-point of the virtual camera based on a position of the player character object and setting the position of the viewpoint of the virtual camera so that a line of sight of the virtual camera follows a position of the offensive character object; and changing the operation mode to the first operation mode based on a second changing instruction input to the operation device.

An eleventh embodiment is a game control method in a game apparatus including one or more processors, wherein the one or more processors execute: in a first operation mode, controlling a movement and an action of a player character object in a virtual space based on an operation input; setting positions of a viewpoint and a look-at-point of a virtual camera based on a position of the player character object; and making an offensive character object appear in the virtual space and changing an operation mode to a second operation mode based on a first changing instruction input, and in a second operation mode, restricting the movement of the player character object; controlling a movement and an action of the offensive character object in the virtual space based on an operation input; setting the position of the look-at-point of the virtual camera based on a position of the player character object and setting the position of the viewpoint of the virtual camera so that a line of sight of the virtual camera follows a position of the offensive character object; and changing the operation mode to the first operation mode based on a second changing instruction input.

According to any one of the ninth to eleventh embodiments, similar to the first embodiment, it is possible to operate two character objects by a new method.

The above described objects and other objects, features, aspects and advantages of the embodiment(s) will become more apparent from the following detailed description when taken in conjunction with the accompanying drawings.

DETAILED DESCRIPTION OF NON-LIMITING EXAMPLE EMBODIMENTS

A non-limiting example game system according to an exemplary embodiment will be described in the following. The non-limiting example game system 1 according to this embodiment comprises a main body apparatus (an information processing apparatus that functions as a game apparatus main body in this embodiment) 2, a left controller 3 and a right controller 4. The left controller 3 and the right controller 4 are attachable to or detachable from the main body apparatus 2, respectively. That is, the game system 1 can be used as a unified apparatus formed by attaching each of the left controller 3 and the right controller 4 to the main body apparatus 2. Moreover, in the game system 1, the main body apparatus 2, the left controller 3 and the right controller 4 can also be used as separate bodies (see FIG. 2). In the following, the hardware structure of the game system 1 according to this embodiment will be described, and then, the control of the game system 1 of this embodiment will be described.

Figure 1:
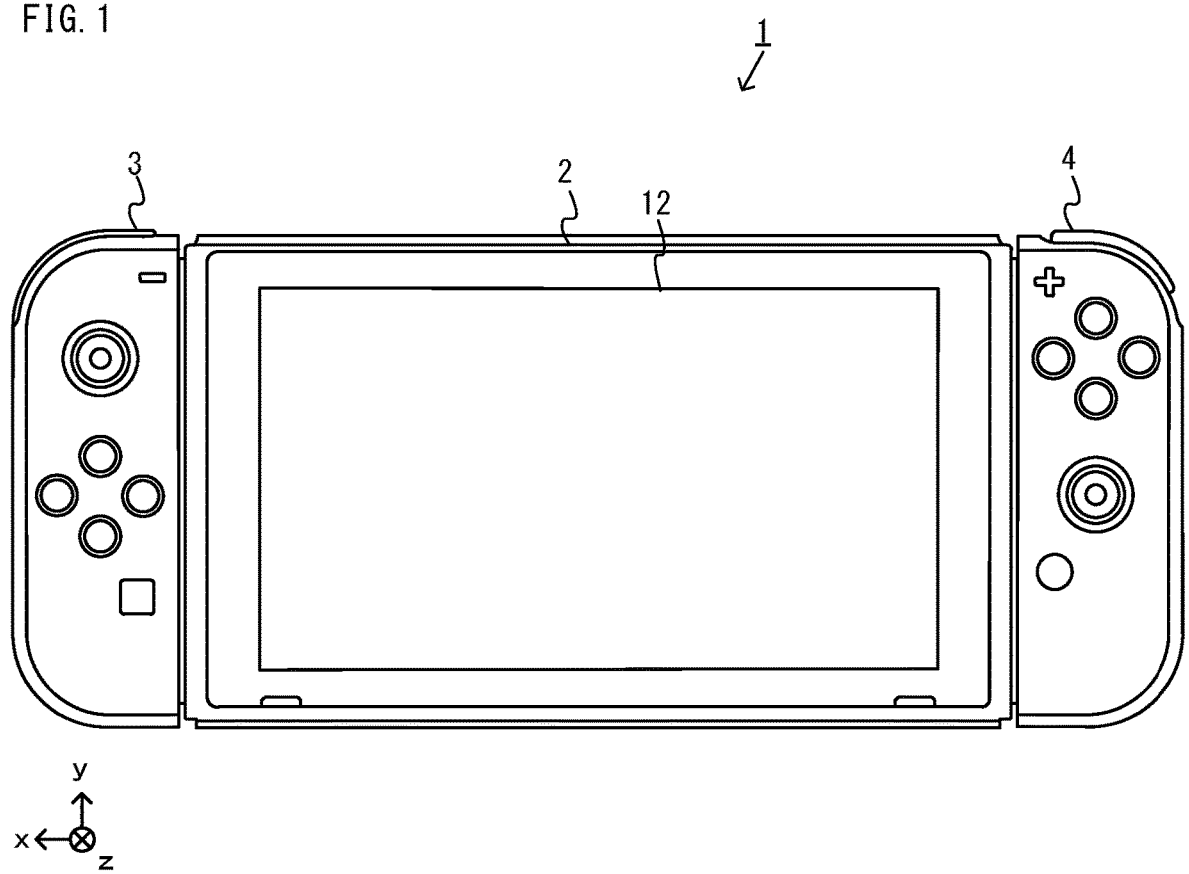
FIG. 1 is an illustration view showing a non-limiting example state wherein a left controller and a right controller are attached to a main body apparatus of this embodiment.

FIG. 1 is an illustration view showing an example of a state where the left controller 3 and the right controller 4 are attached to the main body apparatus 2. As shown in FIG. 1, the left controller 3 and the right controller 4 is respectively attached to the main body apparatus 2, thereby to be unified it. The main body apparatus 2 is an apparatus for performing various processing (game processing, for example) in the game system 1. The main body apparatus 2 comprises a display 12. Each of the left controller 3 and the right controller 4 is a device comprising an operation section with which a user provides inputs.

Figure 2:
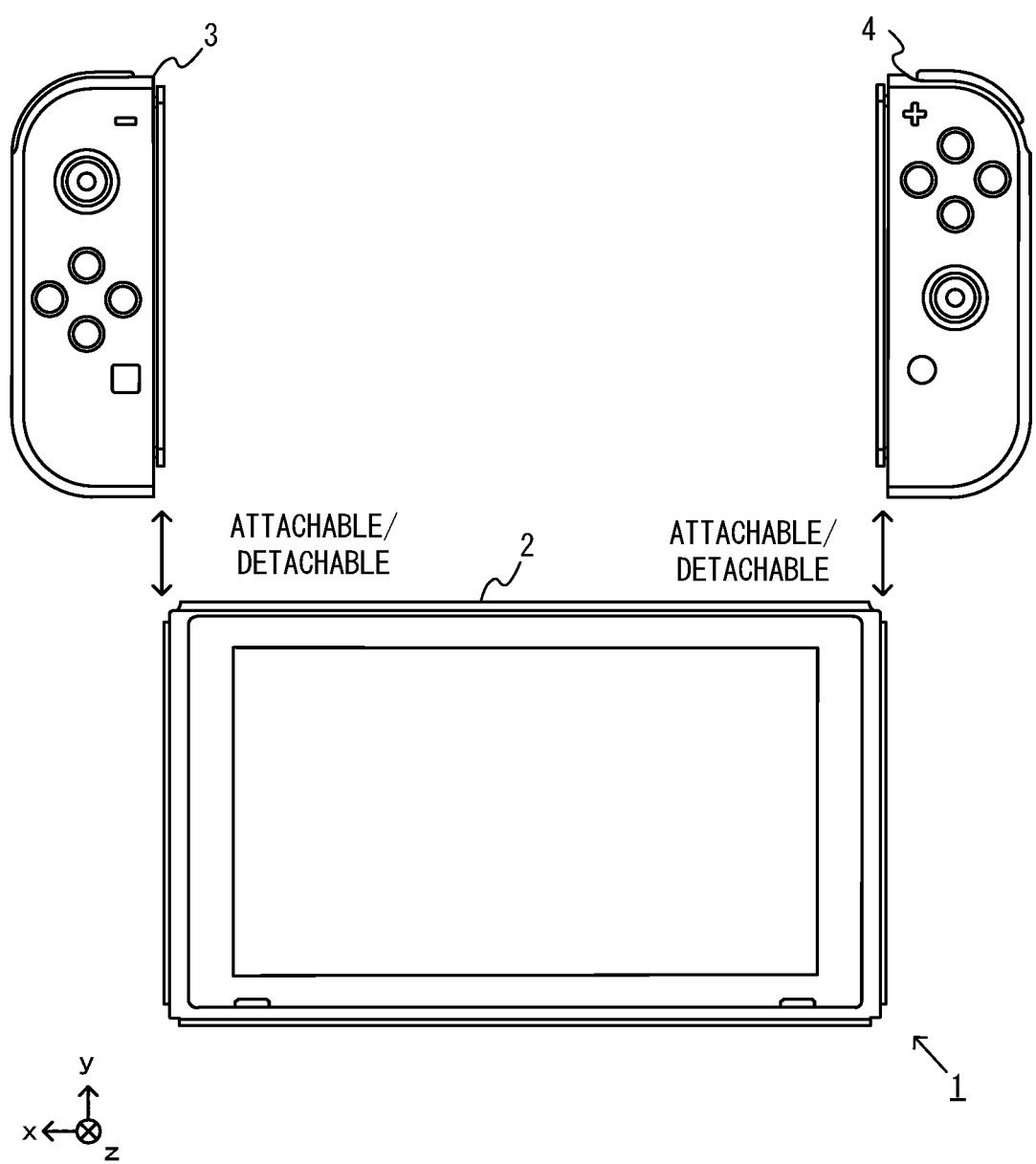
FIG. 2 is an illustration view showing a non-limiting example state where the left controller and the right controller are detached from the main body apparatus, respectively.

FIG. 2 is an illustration view showing an example of a state where the left controller 3 and the right controller 4 are detached from the main body apparatus 2, respectively. As shown in FIG. 1 and FIG. 2, each of the left controller 3 and the right controller 4 is attachable to and detachable from the main body apparatus 2. In addition, it should be noted that the left controller 3 and the right controller 4 may be referred to collectively as a "controller" in the following.

Figure 3:
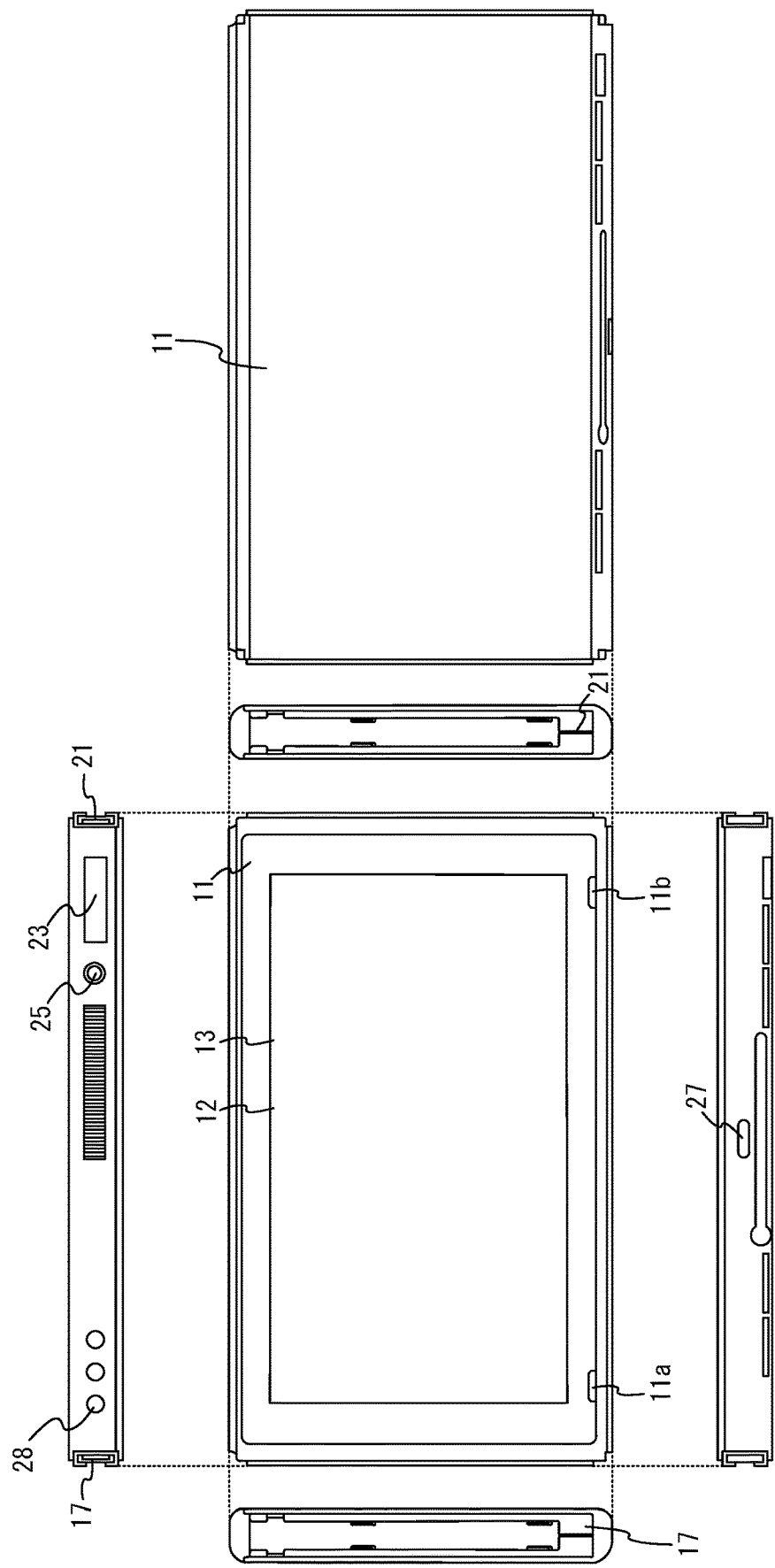
FIG. 3 is six orthogonal views showing a non-limiting example main body apparatus shown in FIG. 1 and FIG. 2.

FIG. 3 is six orthogonal views showing an example of the main body apparatus 2. As shown in FIG. 3, the main body apparatus 2 comprises a housing 11 having an approximately plate-shape. In this embodiment, a main surface (in other words, a surface on a front side, that is, a surface on which the display 12 is provided) of the housing 11 has a generally rectangular shape.

In addition, a shape and a size of the housing 11 are optional. As an example, the housing 11 may be of a portable size. Moreover, the main body apparatus 2 alone or the unified apparatus obtained by attaching the left controller 3 and the right controller 4 to the main body apparatus 2 may be a mobile apparatus. The main body apparatus 2 or the unified apparatus may be a handheld apparatus. The main body apparatus 2 or the unified apparatus may be a handheld apparatus or a portable apparatus.

As shown in FIG. 3, the main body apparatus 2 comprises the display 12 that is provided on the main surface of the housing 11. The display 12 displays an image generated by the main body apparatus 2. In this embodiment, the display 12 is a liquid crystal display device (LCD). However, the display 12 may be an arbitrary type display.

Moreover, the main body apparatus 2 comprises a touch panel 13 on a screen of the display 12. In this embodiment, the touch panel 13 is of a type that allows a multi-touch input (e.g., a capacitive type). However, the touch panel 13 may be of any type, and for example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are emitted through the speaker holes 11a and 11b.

Moreover, the main body apparatus 2 comprises a left terminal 17 that is a terminal for the main body apparatus 2 to perform wired communication with the left controller 3, and a right terminal 21 that is a terminal for the main body apparatus 2 performs wired communication with the right controller 4.

As shown in FIG. 3, the main body apparatus 2 comprises a slot 23. The slot 23 is provided on an upper side surface of the housing 11. The slot 23 has a shape to which a predetermined type of storage medium can be attached. The predetermined type of storage medium is, for example, a dedicated storage medium (e.g., a dedicated memory card) for the game system 1 or an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Moreover, the main body apparatus 2 comprises a power button 28.

The main body apparatus 2 comprises a lower terminal 27. The lower terminal 27 is a terminal through which the main body apparatus 2 performs communication with a cradle. In this embodiment, the lower terminal 27 is a USB connector (more specifically, a female connector). When the unified apparatus or the main body apparatus 2 alone is put on the cradle, the game system 1 can display on a stationary monitor an image generated by and output from the main body apparatus 2. Moreover, in this embodiment, the cradle has the function of charging the unified apparatus or the main body apparatus 2 alone that is put on the cradle. Moreover, the cradle has a function of a hub device (specifically, a USB hub).

Figure 4:
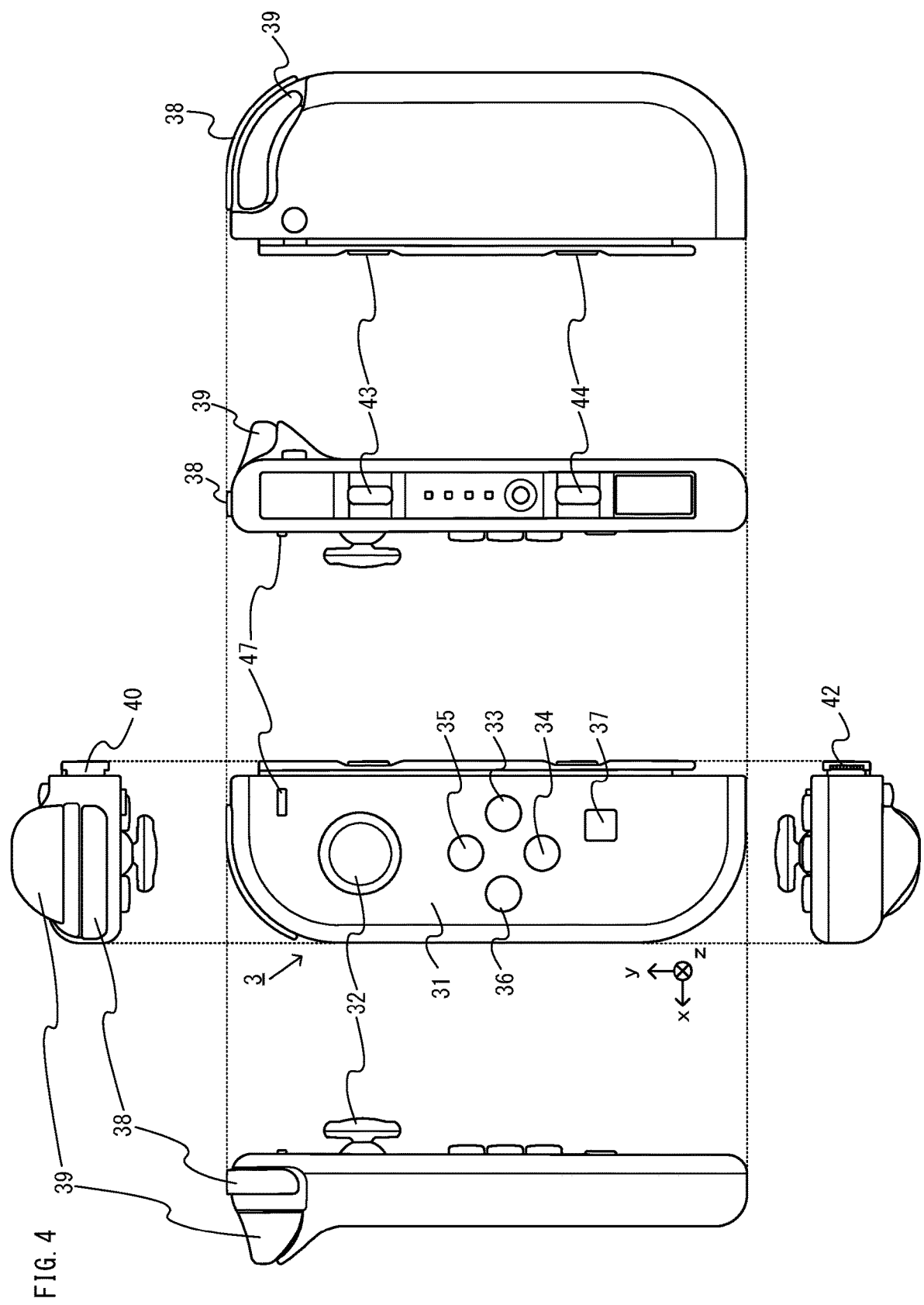
FIG. 4 is sixth orthogonal views showing a non-limiting example left controller shown in FIG. 1 and FIG. 2.

FIG. 4 is six orthogonal views showing an example of the left controller 3. As shown in FIG. 4, the left controller 3 comprises a housing 31. In this embodiment, the housing 31 has a vertically long shape, that is, is shaped to be long in an up-down direction (i.e., a y-axis direction shown in FIG. 1 and FIG. 4). In a state where the left controller 3 is detached from the main body apparatus 2, the left controller 3 can also be held in a direction that the left controller 3 is vertically long. The housing 31 has a shape and a size that when held in a direction that the housing 31 is vertically long, the housing 31 can be held with one hand, especially the left hand. Moreover, the left controller 3 can also be held in a direction that the left controller 3 is horizontally long. When held in the direction that the left controller 3 is horizontally long, the left controller 3 may be held with both hands.

The left controller 3 comprises an analog stick 32. As shown in FIG. 4, the analog stick 32 is provided on a main surface of the housing 31. The analog stick 32 can be used as a direction input section capable of inputting a direction. The user tilts the analog stick 32 and thereby can input a direction corresponding to a tilted direction (and input a magnitude corresponding to a tilted angle). In addition, the left controller 3 may comprise a cross key or a slide stick capable of performing a slide input, or the like as the direction input section, instead of the analog stick. Moreover, in this embodiment, it is possible to provide an input by pressing the analog stick 32.

The left controller 3 comprises various operation buttons. The left controller 3 comprises four (4) operation buttons 33-36 (specifically, a right direction button 33, a down direction button 34, an up direction button 35 and a left direction button 36) on the main surface of the housing 31. Furthermore, the left controller 3 comprises a record button 37 and a "−" (minus) button 47. The left controller 3 comprises an L-button 38 and a ZL-button 39 in an upper left portion of a side surface of the housing 31. Moreover, the left controller 3 comprises an SL-button 43 and an SR-button 44 on a surface at a side to be attached to the main body apparatus 2 out of side surfaces of the housing 31. These operation buttons are used to input instructions according to various programs (e.g., an OS program and an application program) executed by the main body apparatus 2.

Moreover, the left controller 3 comprises a terminal 42 for the left controller 3 to perform wired communication with the main body apparatus 2.

Figure 5:
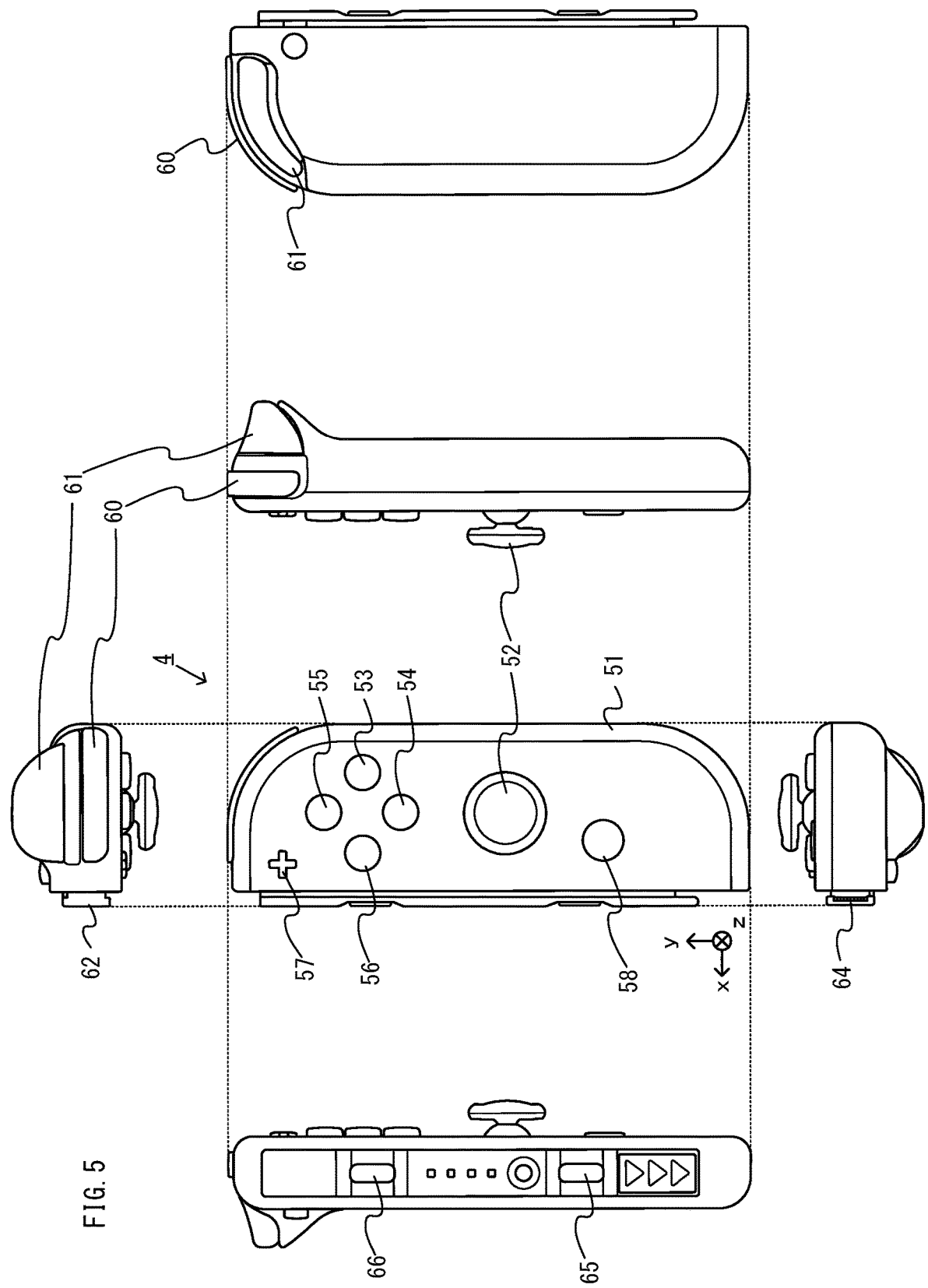
FIG. 5 is sixth orthogonal views showing a non-limiting example right controller shown in FIG. 1 and FIG. 2.

FIG. 5 is six orthogonal views showing an example of the right controller 4. As shown in FIG. 5, the right controller 4 comprises a housing 51. In this embodiment, the housing 51 has a vertically long shape, that is, a shape long in the up-down direction. In a state where the right controller 4 is detached from the main body apparatus 2, the right controller 4 can also be held in a direction that the right controller 4 is vertically long. The housing 51 has a shape and a size that when held in a direction that the housing 51 is vertically long, the housing 51 can be held with one hand, especially the right hand. Moreover, the right controller 4 can also be held in a direction that the right controller 4 is horizontally long. When held in the direction that the right controller 4 is horizontally long, the right controller 4 may be held with both hands.

Similar to the left controller 3, the right controller 4 comprises an analog stick 52 as a direction input section. In this embodiment, the analog stick 52 has the same configuration as that of the analog stick 32 of the left controller 3. Moreover, the right controller 4 may comprise a cross key or a slide stick capable of performing a slide input, or the like as the direction input section, instead of the analog stick. Moreover, similar to the left controller 3, the right controller 4 comprises four (4) operation buttons 53-56 (specifically, an A-button 53, a B-button 54, an X-button 55 and a Y-button 56) on the main surface of the housing 51. Furthermore, the right controller 4 comprises a "+" (plus) button 57 and a home button 58. Moreover, the right controller 4 comprises an R-button 60 and a ZR-button 61 in an upper right portion of a side surface of the housing 51. Moreover, similar to the left controller 3, the right controller 4 comprises an SL-button 65 and an SR-button 66.

Moreover, the right controller 4 comprises a terminal 64 for the right controller 4 to perform wired communication with the main body apparatus 2.

Figure 6:
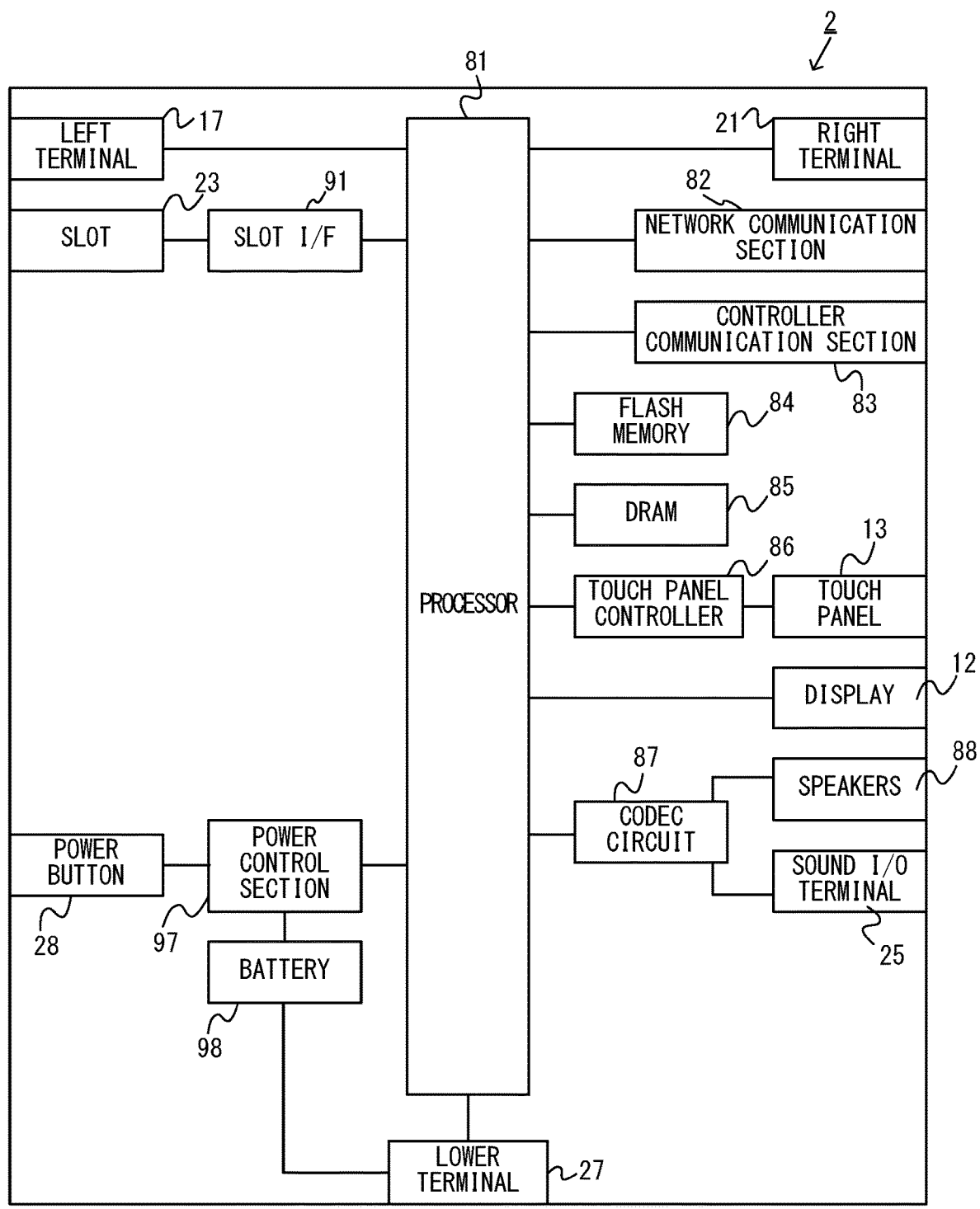
FIG. 6 is a block diagram showing a non-limiting example internal configuration of the main body apparatus shown in FIG. 1 and FIG. 2.

FIG. 6 is a block diagram showing an example of an internal configuration of the main body apparatus 2. The main body apparatus 2 comprises components 81-91, 97 and 98 shown in FIG. 6 in addition to components shown in FIG. 3. Some of the components 81-91, 97 and 98 may be mounted as electronic components on an electronic circuit board to be accommodated in the housing 11.

The main body apparatus 2 comprises a processor 81. The processor 81 is an information processing section that performs various types of information processing to be performed by the main body apparatus 2, and may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 comprises a flash memory 84 and a DRAM (Dynamic Random Access Memory) 85 as examples of internal storage media incorporated in the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 comprises a slot interface (hereinafter, abbreviated as "I/F") 91. The slot I/F 91 is connected to the processor 81. The slot I/F 91 is connected to the slot 23, and reads and writes, in accordance with instructions from the processor 81, data from and to the predetermined type of storage medium (e.g., a dedicated memory card) attached to the slot 23.

The processor 81 appropriately reads and writes data from and to the flash memory 84, the DRAM 85 and each of the above storage media, thereby performing the above-described information processing.

The main body apparatus 2 comprises a network communication section 82. The network communication section 82 is connected to the processor 81. The network communication section 82 performs communication (specifically, wireless communication) with external apparatus via a network. In this embodiment, as a first communication manner, the network communication section 82 is connected to a wireless LAN to perform communication with external apparatus by a system in conformity with the Wi-Fi standard. Moreover, as a second communication manner, the network communication section 82 performs wireless communication with a further main body apparatus 2 of the same type by a predetermined communication system (e.g., communication based on a unique protocol or infrared light communication). In addition, the wireless communication in the above-described second communication manner 45 achieves a function of enabling so-called "local communication", in which the main body apparatus 2 can perform wireless communication with further main body apparatus 2 placed in a closed local network area, and a plurality of main body apparatus 2 perform communication directly with each other to transmit and receive data.

The main body apparatus 2 comprises a controller communication section 83. The controller communication section 83 is connected to the processor 81. The controller communication section 83 performs wireless communication with the left controller 3 and/or the right controller 4. Although communication system between the main body apparatus 2 and the left controller 3 and the right controller 4 is optional, in this embodiment, the controller communication section 83 performs communication with the left controller 3 and with the right controller 4 in conformity with Bluetooth (registered trademark) standard.

The processor 81 is connected to the left terminal 17, the right terminal 21 and the lower terminal 27. When performing wired communication with the left controller 3, the processor 81 transmits data to the left controller 3 via the left terminal 17 and receives (or acquires) operation data from the left controller 3 via the left terminal 17. Moreover, when performing wired communication with the right controller 4, the processor 81 transmits data to the right controller 4 via the right terminal 21 and receives (or acquires) operation data from the right controller 4 via the right terminal 21. Moreover, when performing communication with the cradle, the processor 81 transmits data to the cradle via the lower terminal 27. Thus, in this embodiment, the main body apparatus 2 can perform both wired communication and wireless communication with each of the left controller 3 and the right controller 4. Moreover, when the unified apparatus formed by attaching the left controller 3 and the right controller 4 to the main body apparatus 2 or the main body apparatus 2 alone is attached to the cradle, the main body apparatus 2 can output data (e.g., display image data and sound data) to the stationary monitor or the like via the cradle.

Here, the main body apparatus 2 can perform communication with a plurality of left controllers 3 simultaneously (in other words, in parallel). Moreover, the main body apparatus 2 can perform communication with a plurality of right controllers 4 simultaneously (in other words, in parallel). Therefore, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 comprises a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input is performed, and outputs the data to the processor 81.

Moreover, the display 12 is connected to the processor 81. The processor 81 displays a generated image (e.g., an image generated by performing the above information processing) and/or an externally acquired image on the display 12.

The main body apparatus 2 comprises a codec circuit 87 and speakers (specifically, a left speaker and a right speaker) 88. The codec circuit 87 is connected to the speakers 88 and a sound input/output (I/O) terminal 25 and also connected to the processor 81. The codec circuit 87 is a circuit for controlling an input/output of sound data to and from the speakers 88 and the sound input/output terminal 25.

The main body apparatus 2 comprises a power control section 97 and a battery 98. The power control section 97 is connected to the battery 98 and the processor 81. Moreover, although not shown in FIG. 6, the power control section 97 is connected to respective components of the main body apparatus 2 (specifically, components that receive power supplied from the battery 98, the left terminal 17 and the right terminal 21). Based on a command from the processor 81, the power control section 97 controls power supply from the battery 98 to the above-described components.

Moreover, the battery 98 is connected to the lower terminal 27. When an external charging device (e.g., a cradle) is connected to the lower terminal 27, and power is supplied to the main body apparatus 2 via the lower terminal 27, the battery 98 is charged with the supplied power.

Figure 7:
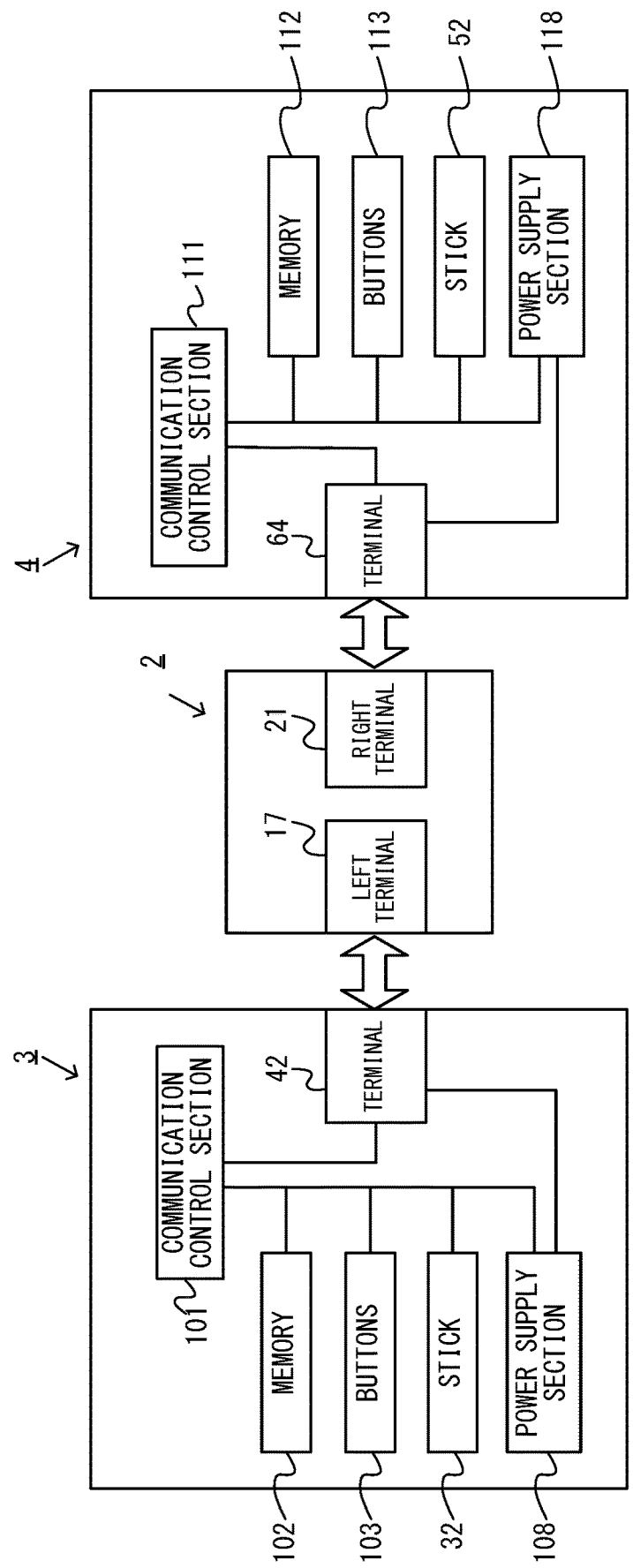
FIG. 7 is a block diagram showing non-limiting example internal configurations of the main body apparatus, the left controller and the right controller shown in FIG. 1 and FIG. 2.

FIG. 7 is a block diagram showing examples of internal configurations of the main body apparatus 2, the left controller 3 and the right controller 4. In addition, details of the internal configuration of the main body apparatus 2 are shown in FIG. 6 and thus are omitted in FIG. 7.

The left controller 3 comprises a communication control section 101 that performs communication with the main body apparatus 2. As shown in FIG. 7, the communication control section 101 is connected to components including the terminal 42. In this embodiment, the communication control section 101 can perform communication with the main body apparatus 2 through both wired communication via the terminal 42 and wireless communication not via the terminal 42. The communication control section 101 controls a method of performing communication by the left controller 3 with the main body apparatus 2. That is, when the left controller 3 is attached to the main body apparatus 2, the communication control section 101 performs communication with the main body apparatus 2 via the terminal 42. Moreover, when the left controller 3 is detached from the main body apparatus 2, the communication control section 101 performs wireless communication with the main body apparatus 2 (specifically, the controller communication section 83). The wireless communication between the communication control section 101 and the controller communication section 83 is performed in accordance with Bluetooth (registered trademark) standard, for example.

Moreover, the left controller 3 comprises a memory 102 such as a flash memory. The communication control section 101 is constituted by a microcomputer (also referred to as a microprocessor), for example, and executes firmware stored in the memory 102, thereby performing various processing.

The left controller 3 comprises buttons 103 (specifically, the buttons 33-39, 43, 44 and 47). Further, the left controller 3 comprises the analog stick (in FIG. 7, indicated as "stick") 32. The respective buttons 103 and the analog stick 32 outputs information regarding an operation performed to itself to the communication control section 101 repeatedly at appropriate timings.

The communication control section 101 acquires information regarding an input(s) (specifically, information regarding an operation or the detection results of the sensors) from respective input sections (specifically, the buttons 103, the analog stick 32 and the sensors 104 and 105). The communication control section 101 transmits operation data including the acquired information (or information obtained by performing predetermined processing on the acquired information) to the main body apparatus 2. In addition, the operation data is transmitted repeatedly, once every predetermined period of time. In addition, the interval that the information regarding an input(s) is transmitted from each of the input sections to the main body apparatus 2 may or may not be the same.

The above-described operation data is transmitted to the main body apparatus 2, whereby the main body apparatus 2 can obtain an input(s) provided to the left controller 3. That is, the main body apparatus 2 can determine operations on the buttons 103 and the analog stick 32 based on the operation data.

The left controller 3 comprises a power supply section 108. In this embodiment, the power supply section 108 has a battery and a power control circuit. Although not shown, the power control circuit is connected to the battery and also connected to components of the left controller 3 (specifically, components that receive power supplied from the battery).

As shown in FIG. 7, the right controller 4 comprises a communication control section 111 that performs communication with the main body apparatus 2. Moreover, the right controller 4 comprises a memory 112 connected to the communication control section 111. The communication control section 111 is connected to components including the terminal 64. The communication control section 111 and the memory 112 have functions similar to those of the communication control section 101 and the memory 102, respectively, of the left controller 3. Therefore, the communication control section 111 can perform communication with the main body apparatus 2 through both wired communication via the terminal 64 and wireless communication not via the terminal 64 (specifically, communication in conformity with the Bluetooth (registered trademark) standard), and a method of communication to be performed with the main body apparatus 2 is controlled by the right controller 4.

The right controller 4 comprises input sections similar to the input sections of the left controller 3. Specifically, the right controller 4 comprises buttons 113 and the analog stick 52. These input sections have functions similar to those of the input sections of the left controller 3 and operate similarly to the input sections of the left controller 3.

The right controller 4 comprises a power supply section 118. The power supply section 118 has a function similar to the power supply section 108 of the left controller 3, and operates similarly to the power supply section 108.

Figure 8:
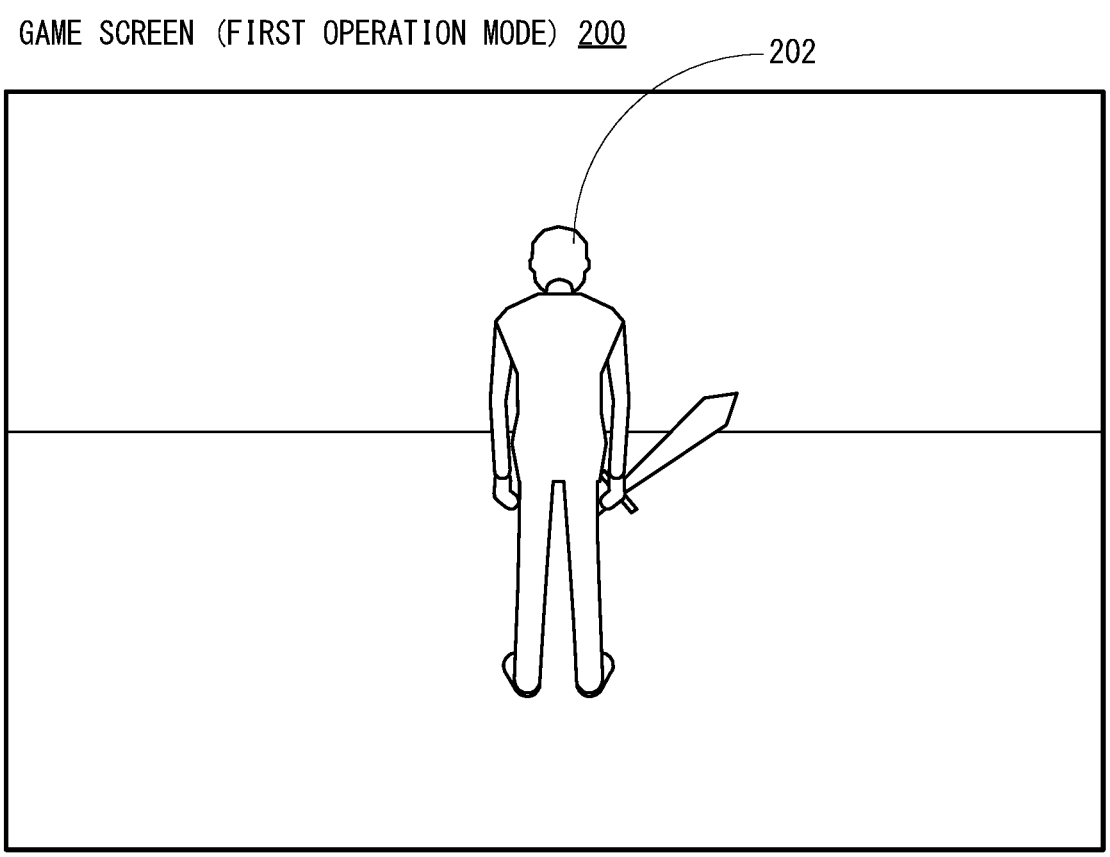
FIG. 8 is a view showing a non-limiting example game image in a first operation mode.

Next, with reference to FIG. 8-FIG. 16, an outline of game processing of a virtual game executable in the game system 1 of this embodiment will be described. FIG. 8 is a view showing a non-limiting example game image displayed on a display (for example, display 12) when an application of a virtual game of this embodiment is executed.

As shown in FIG. 8, a game screen 200 as the non-limiting example game image includes a main player character 202. The player character 202 is a character or object that execution of a movement and an arbitrary action is controlled based on an operation of a player. As the action of the player character 202, in a virtual place, i.e., in a certain virtual space, acquiring an item, attacking an enemy character 204 (see FIG. 9), avoiding (defending) an attack of the enemy character 204, etc. correspond.

In this embodiment, the player makes the player character 202 move in the virtual space by operating the analog stick 32, and perform an attack assigned to each of the A-button 53, the B-button 54, the X-button 55 or the Y-button 56 by operating one of the buttons 53-56. However, if any one of the A-button 53, the B-button 54, the X-button 55 and the Y-button 56 is long-depressed, or if two or more buttons are operated compositely, the player character 202 perform an attack in a special move or a combo move. If the attack of the player character 202 hits the enemy character 204 (see FIG. 9), the enemy character 204 can be damaged. Moreover, the player character 202 can avoid (or defend) an attack of the enemy character 204 by operating the ZR-button 61.

A background object is also included in the game image. In this embodiment, the background object mainly means a terrain object arranged in the virtual space. Moreover, in this embodiment, a terrain means the ground (including a road, an open space, etc.), a floor, a tree, grass, a flower, a building, stairs, a cave, a cliff, a wall, etc.

The main body apparatus 2 functions also as an image processing apparatus, and generates and outputs (displays) display image data for the game image corresponding to various types of screens, such as the game screen 200. The processor 81 arranges various types of objects and characters in a three-dimensional virtual space, thereby to generate a certain sight or scene. An image that this scene is imaged by a virtual camera 250 (an image viewed from a viewpoint) is displayed on the display 12 as the game image.

A state where one character (in this embodiment, the player character 202) operable by the player is thus made to appear in the virtual space and only this character is operated is referred to as a first operation mode. However, in the first operation mode, there is an occasion that other characters, such as the enemy character 204 that the player does not operate may appear.

In this first operation mode, if the enemy character 204 does not appear, the virtual camera 250 is located in a position behind the player character 202 by a first predetermined distance (for example, three (3) meters in the virtual space) so that the player character 202 is viewed from diagonally above and captured in the front, and the virtual camera 250 follows the player character 202. For example, in the first operation mode, a first predetermined position (in this embodiment, a position of the waist) of the player character 202 is set as a position of a locking-at-point or a gazing point of the virtual camera 250. Moreover, a direction of the virtual camera 250 is set in advance by a camera coordinate system. In the first operation mode, the direction of the virtual camera 250 in the camera coordinate system is set in a first predetermined direction. A three-dimensional position of the virtual camera 250 is determined so as to satisfy these settings. This positional relationship of the virtual camera 250 with respect to the player character 202 is referred to as "predetermined positional relationship".

However, in the camera coordinate system of the virtual camera 250, in a case where the virtual camera 250 is oriented to a reference direction (i.e., in a case of a reference posture), an axis overlapping with a line of sight is set as an x-axis, an axis perpendicular to the x-axis in a horizontal direction is set as a y-axis, and an axis perpendicular to both the x-axis and the y-axis is set as a z axis. Then, a direction (or posture) of the virtual camera 250 is represented by an angle around the y-axis (pitch angle), an angle around the x-axis (roll angle) and an angle around the z axis (yaw angle). In the above-described first predetermined direction, as an example, the yaw angle and the roll angle are both set to 0 (zero) degrees, and the pitch angle is set downward at 30 (thirty) degrees.

Figure 9:
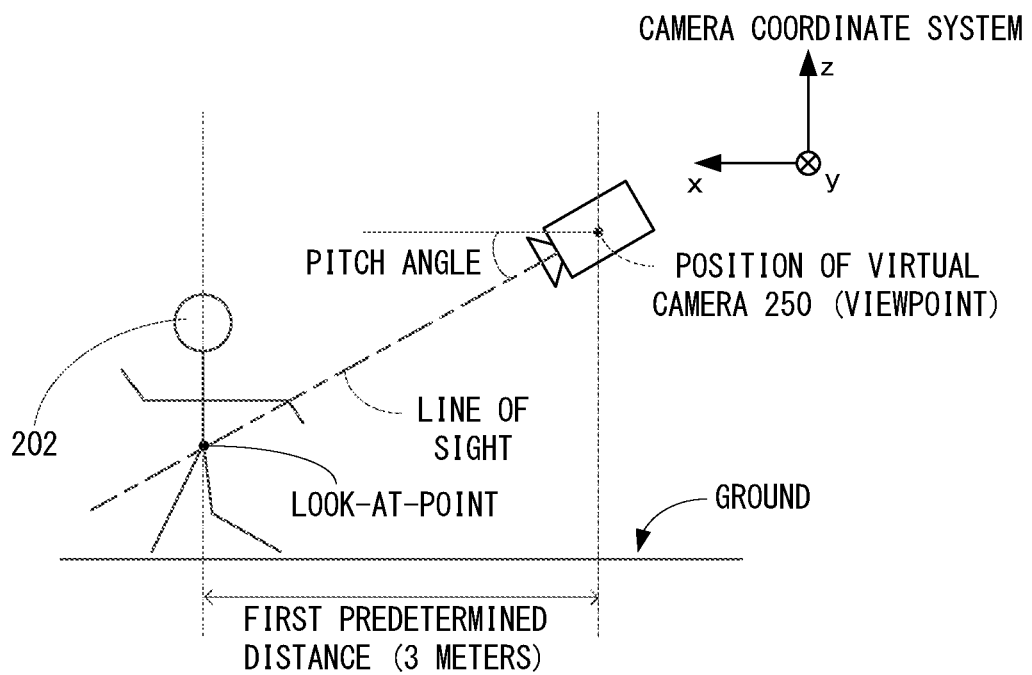
FIG. 9 is a view showing a non-limiting example positional relationship of a player character and a virtual camera in a virtual space, in case of being shown in FIG. 8.

FIG. 9 shows a non-limiting example situation that the virtual space in a case where the game image shown in FIG. 8 is displayed is being viewed from a side of the player character 202 and the virtual camera 250. However, in FIG. 9, the player character 202 is simplified.

As described above, in the predetermined positional relationship, a distance between the virtual camera 250 and the player character 202 is set to a first predetermined distance in a horizontal distance, the direction of the virtual camera 250 is set to a first predetermined direction, and the look-at-point of the virtual camera 250 is set to a first predetermined position of the player character 202. Therefore, a height of the virtual camera 250 is determined so that the line of sight of the virtual camera 250 may pass the look-at-point. That is, a position (also referred to as "viewpoint") of the virtual camera 250 in the virtual space is set or calculated.

However, a position of the player character 202 in the virtual space is a position of the foot. This is an example, and in a case where the player character 202 does not have a human-like appearance, the position of the player character is a center position of a portion that the player character 202 contacts the ground in the virtual space. Moreover, in a case where the player character 202 is floating in the air, the position of the player character 202 is a position that a virtual line that hangs down from a reference point (for example, the center point of the player character 202) collides with the ground.

Moreover, in this first operation mode, it is possible to move the virtual camera 250 by tilting the analog stick 52. For example, the look-at-point of the virtual camera 250 remains at the first predetermined position of the player character 202, and in a state where the virtual camera 250 is oriented to the look-at-point, the virtual camera 250 is moved in a direction that the analog stick 52 is tilted. However, the distance between the virtual camera 250 and the player character 202 is maintained at the first predetermined distance, and the direction of the virtual camera 250 is still the first predetermined direction in the camera coordinate system. However, when the virtual camera 250 is moved according to an operation of the player, the look-at-point of the virtual camera 250 may be set to another predetermined position (for example, a position of the head of the player character 202), and the direction of the virtual camera 250 may be set to another direction (e.g., the pitch angle, the roll angle and the yaw angle are all 0 (zero) degrees).

Therefore, when viewing the virtual space from the above, the virtual camera 250 is moved (rotated) to a direction that the analog stick 52 is tilted on a circle having a radius of the first predetermined distance cantering on the player character 202. That is, the virtual camera 250 is moved in a yaw direction, and a movement direction at this time is a direction that the analog stick 52 is tilted.

Although illustration is omitted, a game image that indicates a situation of circumference centering on the player character 202 is displayed on the display 12 by moving the virtual camera 250 according to an operation of the player. Therefore, the player can know the situation of the circumference centering on the player character 202 in the virtual space.

However, even if the virtual camera 250 is moved according to an operation of the player, the virtual camera 250 is returned to the position having the predetermined positional relationship by stopping the operation of the analog stick 52. That is, the camera control returns to the ordinary control of the virtual camera 250. Thus, the direction of the line of sight of the virtual camera 250 is changed temporarily.

Moreover, there is an occasion that the position and an imaging direction of the virtual camera 250 are controlled so as to forcibly image other characters. For example, a case where an animation that a predetermined enemy characters 204 such as a boss character appears in the virtual space is produced, a case where an animation that a predetermined enemy character 204 collapses (loses a battle) is reproduced, etc. correspond.

Figure 10:
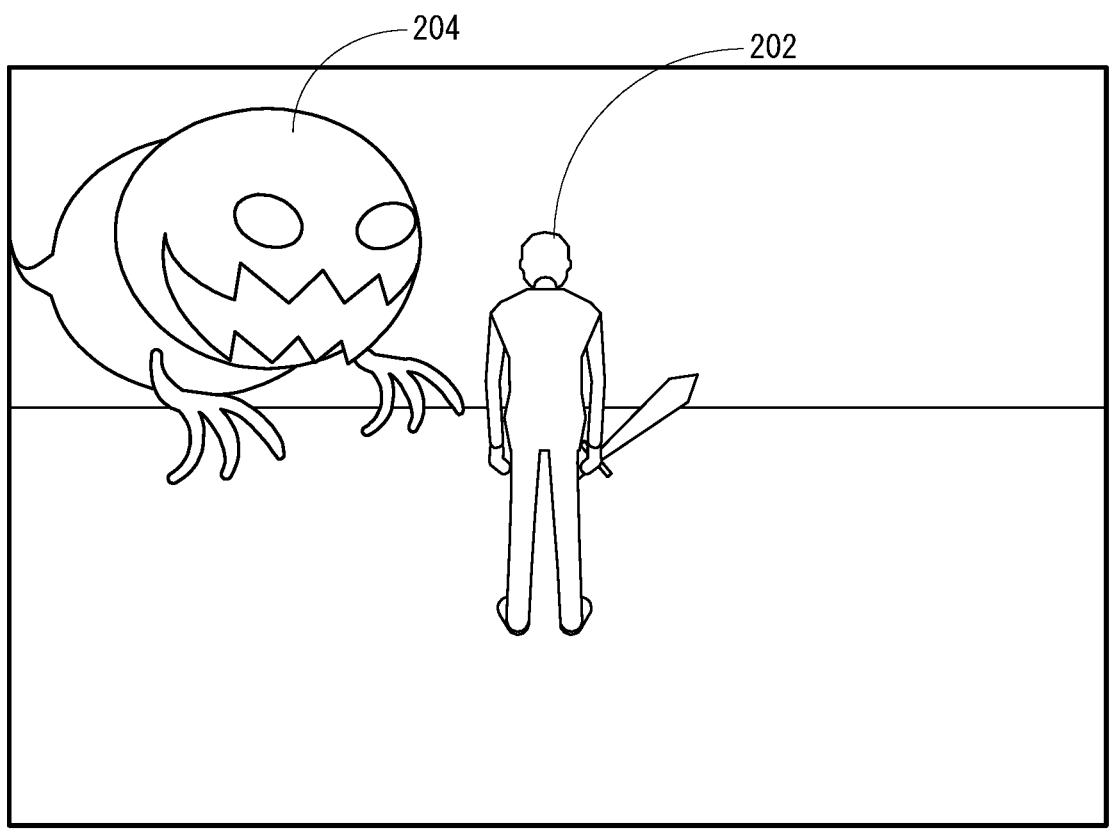
FIG. 10 is a view showing another non-limiting example game image in the first operation mode.

FIG. 10 shows a non-limiting example game screen 200 corresponding to a game image when the enemy character 204 appears in the first operation mode. If the enemy character 204 appears in the first operation mode, the distance between the player character 202 and the virtual camera 250 is changed to a second predetermined distance (for example, 4 (four) meters in the virtual space) longer than the first predetermined distance. However, the position of the look-at-point remains the first predetermined position, and the direction of the virtual camera 250 in the camera coordinate system is still the first predetermined direction. Therefore, the virtual camera 250 is moved on a straight line overlapping with the line of sight to be gradually away from the player character 202 so that a horizontal distance with the player character 202 becomes the second predetermined distance. In this embodiment, when moving away from the player character 202 or approaching the player character 202, the virtual camera 250 is moved on a straight line that is overlaps with the line of sight by a third predetermined distance (for example, 5 (five) centimeters in the virtual space) for each frame. In the following, the same applies to a case where the horizontal distance between the player character 202 and the virtual camera 250 is changed, a case where the position of the virtual camera 250 is changed, or those both are changed.

Since the position of the virtual camera 250 is thus away from the player character 202, in the game screen 200 of FIG. 9, the virtual space of a range wider than that of the game screen 200 of FIG. 8 is drawn. Therefore, it is possible to make not only the player character 202 but also a part or all of the enemy characters 204 appearing in the virtual space be included in a single game image as much as possible.

However, the setting of the virtual camera 250 when the enemy character 204 appears in the virtual space is an example, and in other embodiments, the look-at-point may be set between the player character 202 and the enemy character 204 (for example, an intermediate position). Even if in such a way, it is possible to make not only the player character 202 but also a part or all of the enemy characters 204 be included in a single game image.

The enemy character 204 is a non-player character or object that is controlled by not an operation by the player but the computer (processor 81 of FIG. 6). As an action of the enemy character 204, moving, attacking the player character 202 or defending the attack from the player character 202 corresponds.

As described above, if the player character 202 attacks the enemy character 204 by an operation of the player, the enemy character 204 may be damaged. If the enemy character 204 is damaged, a physical power value (HP) of the enemy character 204 is subtracted, and if the physical power value becomes 0 (zero), the enemy character 204 is made to disappear (to be deleted). For example, if defeating a predetermined enemy character 204 such as a boss character, a stage or game becomes to be cleared. Inversely, if the computer makes the enemy character 204 attack the player character 202, the player character 202 is damaged. If the player character 202 is damaged, the physical power value of the player character 202 is subtracted, and if the physical power value is becomes 0 (zero), the player character 202 is made to disappear (to be deleted). In this case, for example, it becomes game over.

Although detailed description is omitted, in the first operation mode, the player can select a type of the offensive character 210 (see FIG. 11) to be used by depressing the operation button 33, the operation button 35 or the operation button 36. Moreover, the player can change equipment (for example, weapon) of the player character 202 by depressing the L-button 38. Furthermore, the player can make the player character 202 avoid the attack of the enemy character 204 by depressing the ZR-button 61.

Moreover, in the first operation mode, if the player depresses the ZL-button 39, the operation mode is changed (or shifted) from the first operation mode to a second operation mode, and only while the player keeps depressing the ZL-button 39, the second operation mode is continued. In this embodiment, the second operation mode means a state where another player character 210 that is capable of being operated by the player to attack the enemy character 204 (hereinafter, referred to as "offensive character") is made to appear in the virtual space in addition to the player character 202, and this offensive character 210 is made to move and perform an arbitrary action by an operation of the player. As an action of the offensive character 210, in a certain virtual place, that is, the virtual space, acquiring an item, attacking the enemy character 204, defending the attack of the enemy character 204, etc. correspond.

However, in a case where the operation mode is changed from the first operation mode to the second operation mode in the midway that the player character 202 is performing an attack action in the first operation mode, the attack action of the player character 202 in the middle is continued (or performed) until it is completed, and if the attack by this attack action hits the enemy character 204, the enemy character 204 is damaged. That is, since the player character continues the attack action until it is completed even when operation mode is changed from the first operation mode to the second operation mode, the player character 202 and the offensive character 210 can attack simultaneously, temporarily.

Moreover, although illustration is omitted, when a plurality of enemy characters 204 appear, by depressing the analog stick 52, the player can lock on one enemy character 204, thereby to attack the locked-on enemy character 204. At this time, the distance between the player character 202 and the virtual camera 250 remains the second predetermined distance. Moreover, the direction of the virtual camera 250 is set in the second predetermined direction in the camera coordinate system. As an example, in the second predetermined direction, the pitch angle is 5 (five) degrees, and the roll angle and the yaw angle are both 0 (zero) degrees. Furthermore, the look-at-point of the virtual camera 250 is set to a second predetermined position (for example, intermediate position) between the player character 202 and the locked-on enemy character 204. However, the intermediate position is the midpoint of a line segment connecting the reference point (for example, center point) of the player character 202 and the reference point (for example, center point) of the enemy character 204 to each other. Therefore, if the one enemy character 204 is locked-on, the player character 202 and the whole or a portion of the locked-on enemy character 204 are included in a single game image.

Moreover, when the one enemy character 204 is being locked-on, if the analog stick 52 is depressed, the lock-on is released. For each time the analog stick 52 is depressed, lock-on and release of the lock-on are repeated. One enemy character 204 to be locked-on is selected, in sequence or at random, out of a plurality of enemy characters 204.

Figure 11:
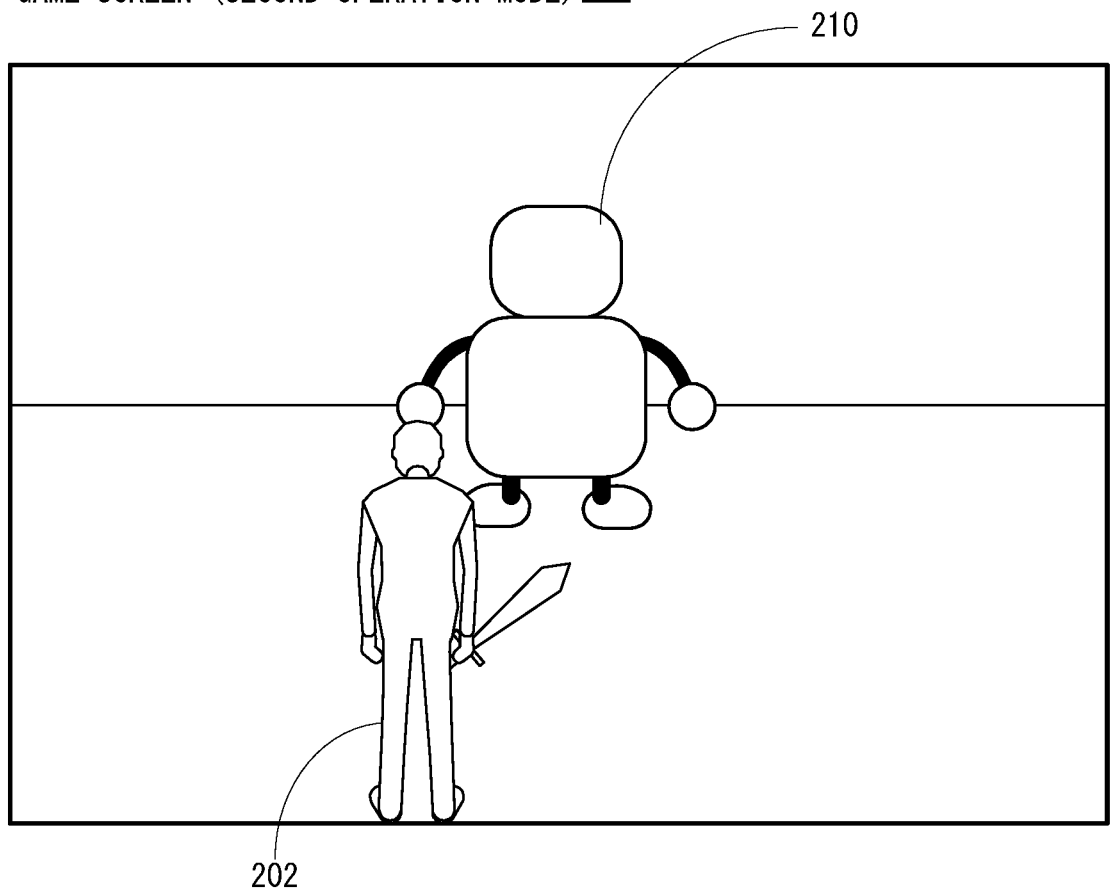
FIG. 11 is a view showing a first non-limiting example game image in a second operation mode.

FIG. 11 is a view showing a non-limiting example game screen 200 corresponding to a game image in the second operation mode. In the game screen 200 shown in FIG. 11, the offensive character 210 is included in addition to the player character 202. As described above, in the second operation mode, a movement and an action of the offensive character 210 can be controlled by an operation of the player. Therefore, in the second operation mode, the player character 202 does not move and perform an action by an operation of the player. However, the action of the player character 202 may be controlled by the computer (processor 81 of FIG. 6). That is, the movement of the player character 202 is restricted in the second operation mode.

In addition, in this embodiment, when the operation mode is changed from the first operation mode to the second operation mode, the offensive character 210 appears in the virtual space as if spring out from the ground. As an example, a position that the offensive character 210 springs out is the front of the player character 202 in the virtual space, and is a position corresponding to a center position of the game screen 200. In another example, the offensive character 210 may emerge from a different dimensional space or fall from the sky.

Figure 12:
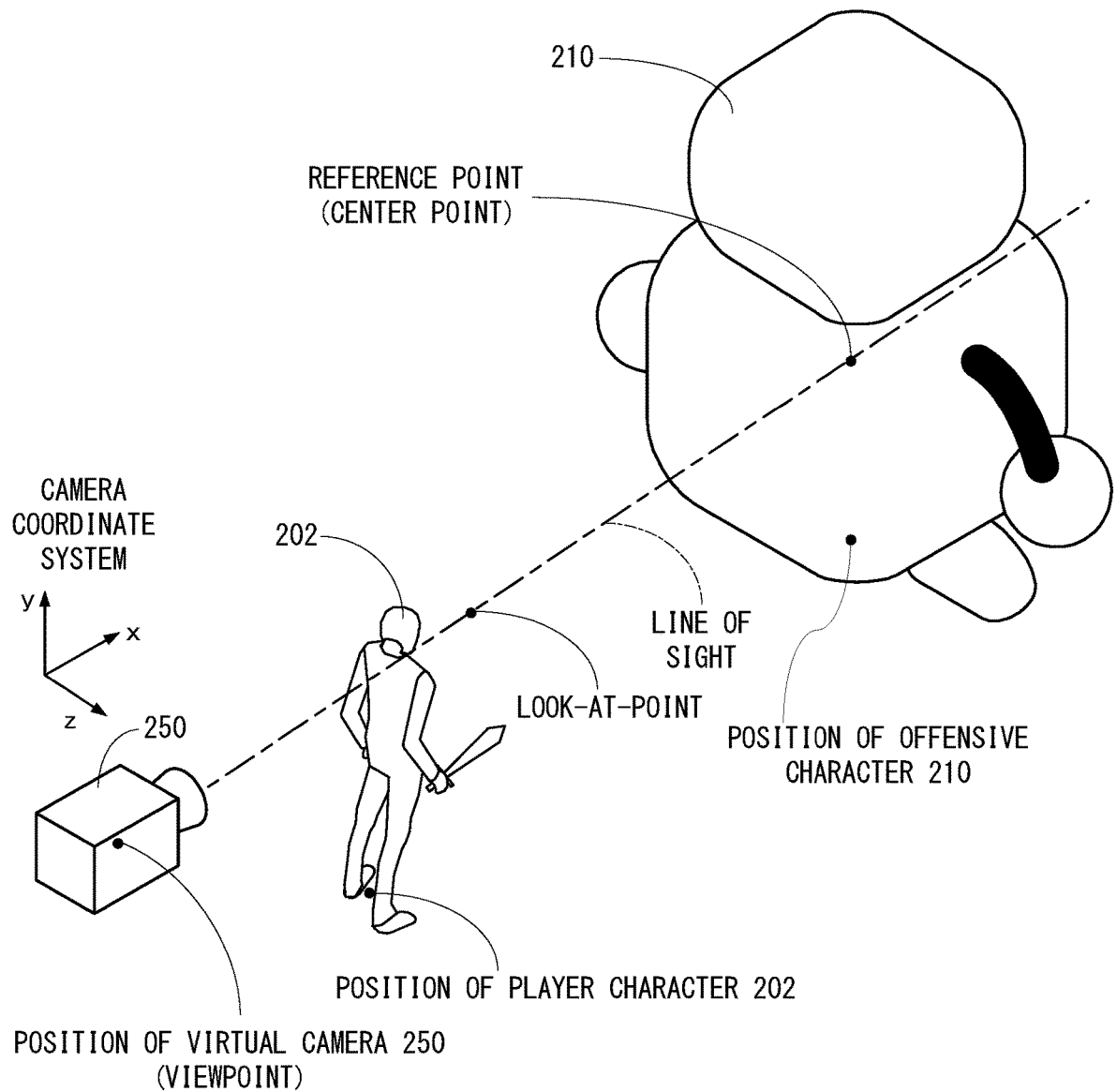
FIG. 12 is a view showing a non-limiting example positional relationship of the player character, an offensive character and a virtual camera in the virtual space, in case of being shown in FIG. 11.

FIG. 12 shows a non-limiting example situation that the virtual space in a case where the game screen 200 shown in FIG. 11 is displayed is viewed from diagonally above the player character 202, the offensive character 210 and the virtual camera 250.

In the second operation mode, the virtual camera 250 is controlled so that both the player character 202 and the offensive character 210 are fit in the field angle of the virtual camera 250 as much as possible. Specifically, as shown in FIG. 12, in the second operation mode, the look-at-point of the virtual camera 250 is set to a third predetermined position with respect to the player character 202. The third predetermined position is a position at the upper right of the player character 202, and is set to a position away from the position of the player character 202 in a right direction and in an upper direction by respective predetermined distances.

Moreover, in the second operation mode, the direction of the virtual camera 250 is set in a third predetermined direction in the camera coordinate system. As an example, in the third predetermined direction, the pitch angle is 5 (five) degrees upward and the roll angle and the yaw angle are both 0 (zero) degrees. Moreover, the virtual camera 250 is arranged in a position capable of capturing centering on the reference point of the offensive character 210 (hereinafter, referred to as "fourth predetermined position"). For example, the fourth predetermined position may be a position of the center of the whole, the center of the torso or the center of the face in the offensive character 210. That is, the virtual camera 250 is arranged so that the line of sight of the virtual camera 250 may pass both the third predetermined position and the fourth predetermined position.

In addition, in this embodiment, since the offensive character 210 is larger than the player character 202, the position of the look-at-point is set in a position at the upper right of the player character 202, and the virtual camera 250 in the camera coordinate system is set to the direction toward diagonally above. In other embodiments, if the offensive character 210 is smaller than the player character 202, for example, the position of the look-at-point is set in a position at the upper right of the player character 202, and the virtual camera 250 in the camera coordinate system is set to the direction toward diagonally below.

Basically, also in the second operation mode, the virtual camera 250 is arranged in a position away from the player character 202 by the first predetermined distance behind the player character 202. However, when the offensive character 210 is away from the virtual camera 250 by a fourth predetermined distance (for example, 20 (twenty) meters in the virtual space) or more, the virtual camera 250 is brought closer to the offensive character 210, and when the offensive character 210 is approaching the virtual camera 250 by a fifth predetermined distance (for example, 5 (five) meters in the virtual space) or lesser, the virtual camera 250 is made to keep away from the offensive character 210.

However, a position of the offensive character 210 in the virtual space is the center position of a portion that the offensive character 210 contacts the ground. In addition, when the offensive character 210 is floating in the air, the position of the offensive character 210 is a position that a virtual line hanging down from the reference point (for example, the center point of the offensive character 210) collides with the ground.

In this embodiment, when the offensive character 210 is away from the virtual camera 250 by the fourth predetermined distance or more, the virtual camera 250 is changed to a position that the horizontal distance with the player character 202 becomes a sixth predetermined distance (for example, 2 (two) meters in the virtual space) shorter than the first predetermined distance. Moreover, when the offensive character 210 approaches the virtual camera 250 by the fifth predetermined distance or lesser, the virtual camera 250 is changed to a position that the horizontal distance with the player character 202 becomes a seventh predetermined distance (for example, 4 (four) meters in the virtual space) longer than the first predetermined distance. That is, in the second operation mode, when the distance between the offensive character 210 and the virtual camera 250 is between the fourth predetermined distance and the fifth predetermined distance, the distance between the player character 202 and the virtual camera 250 is set to the first predetermined distance.

Figure 13:
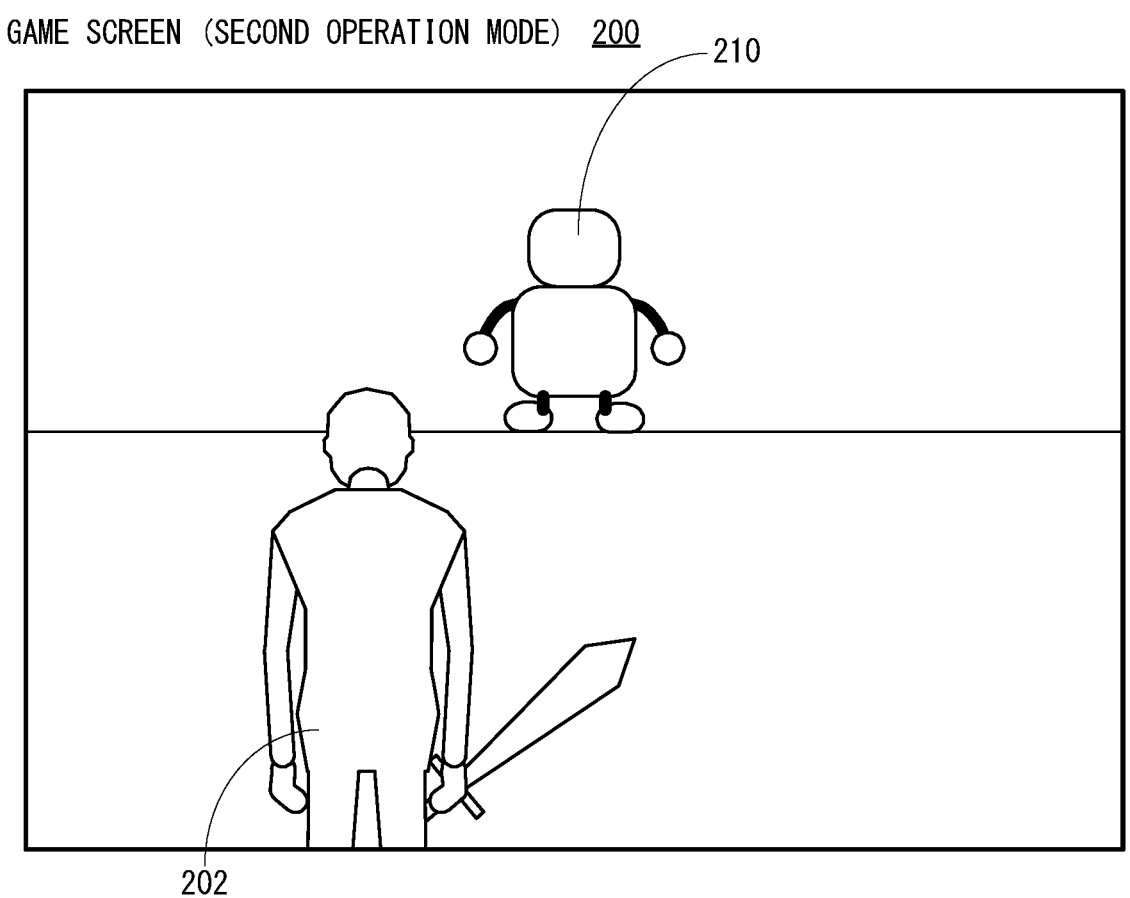
FIG. 13 is a view showing a second non-limiting example game image in the second operation mode.
Figure 14:
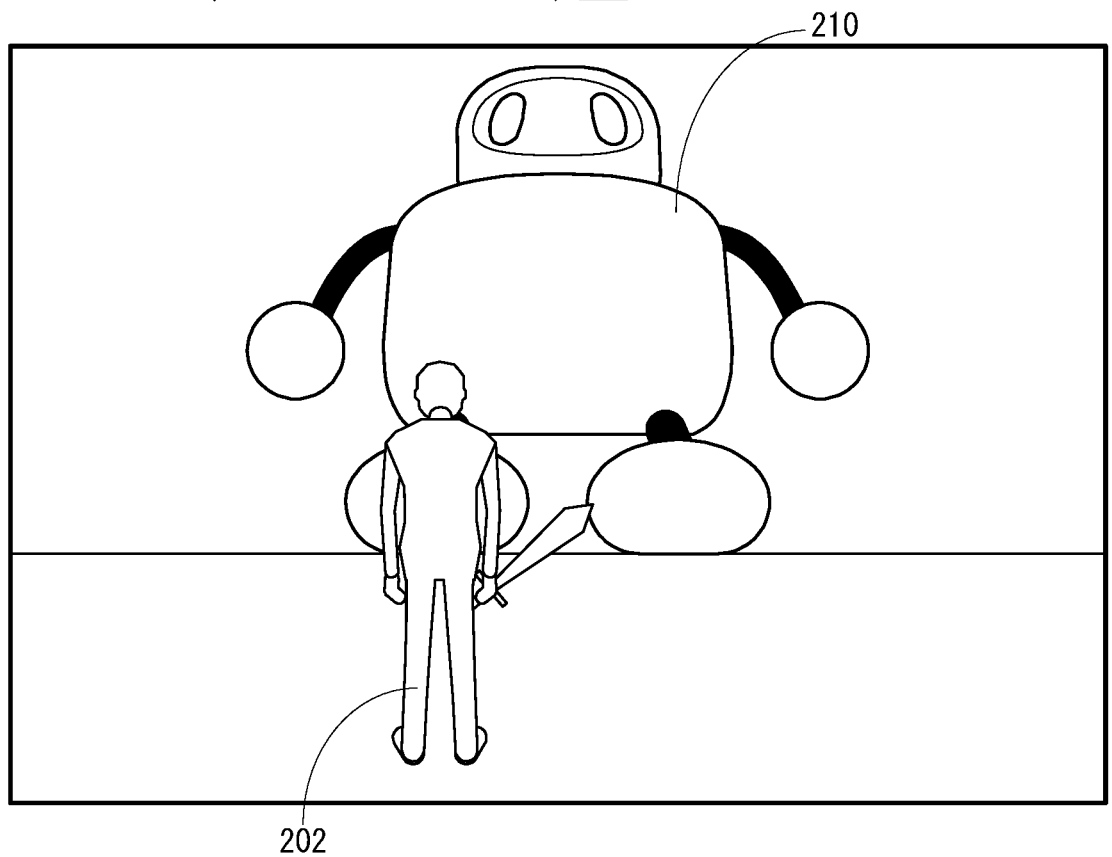
FIG. 14 is a view showing a third non-limiting example game image in the second operation mode.

FIG. 13 shows a non-limiting example game screen 200 corresponding to a game image when the offensive character 210 is away from the virtual camera 250 by the fourth predetermined distance or more, and FIG. 14 shows a non-limiting example game screen 200 corresponding to a game image when the offensive character 210 approaches the virtual camera 250 by the fifth predetermined distance or lesser.

The game screen 200 shown in FIG. 13 is a game image that the offensive character 210 is moved in a direction away from the player character 202 in the game image shown in FIG. 11. As described above, since the virtual camera 250 is brought closer to the player character 202, the player character 202 is displayed slightly larger as can be understood compared with the game image shown in FIG. 11.

Moreover, the game screen 200 shown in FIG. 14 is a game image that the offensive character 210 is moved in a direction approaching the player character 202 in the game image shown in FIG. 11. As described above, since the virtual camera 250 is kept away from the player character 202, the player character 202 is displayed slightly smaller as can be understood compared with the game image shown in FIG. 11. Moreover, the whole of the offensive character 210 is included in the game image.

That is, in this embodiment, in order to display the player character 202 and the offensive character 210 as easy to see as possible, the distance between the player character 202 and the virtual camera 250 is changed (adjusted). Therefore, it is easy to understand that the player character 202 manipulates the offensive character 210.

Moreover, in the second operation mode, similar to the first operation mode, the virtual camera 250 can be moved by an operation of the player. However, duplicate description on movement of the virtual camera 250 will be omitted. Also in the second operation mode, when the player stops the virtual camera 250, the control returns to the ordinary control of the virtual camera 250. Also in the second operation mode, the direction of the line of sight of the virtual camera 250 can be changed temporarily.

Figure 15:
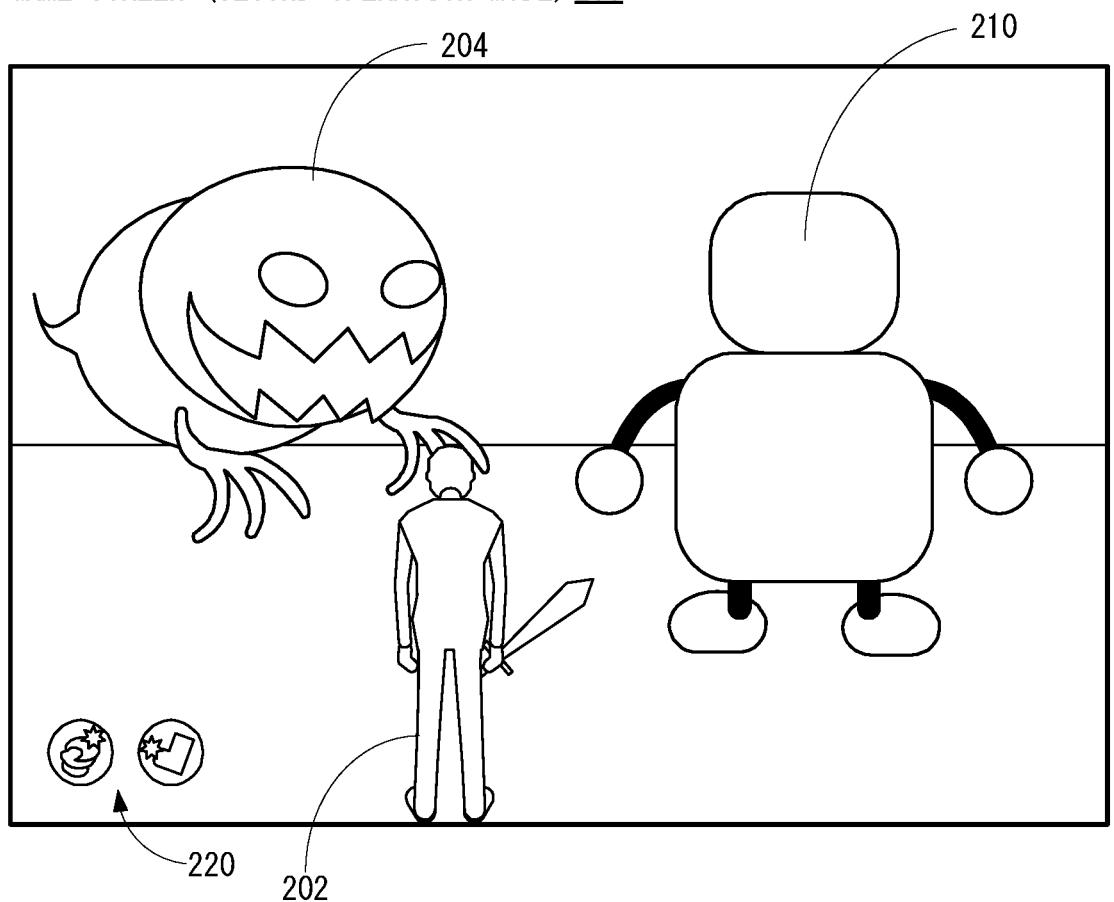
FIG. 15 is a view showing a fourth non-limiting example game image in the second operation mode.
Figure 16:
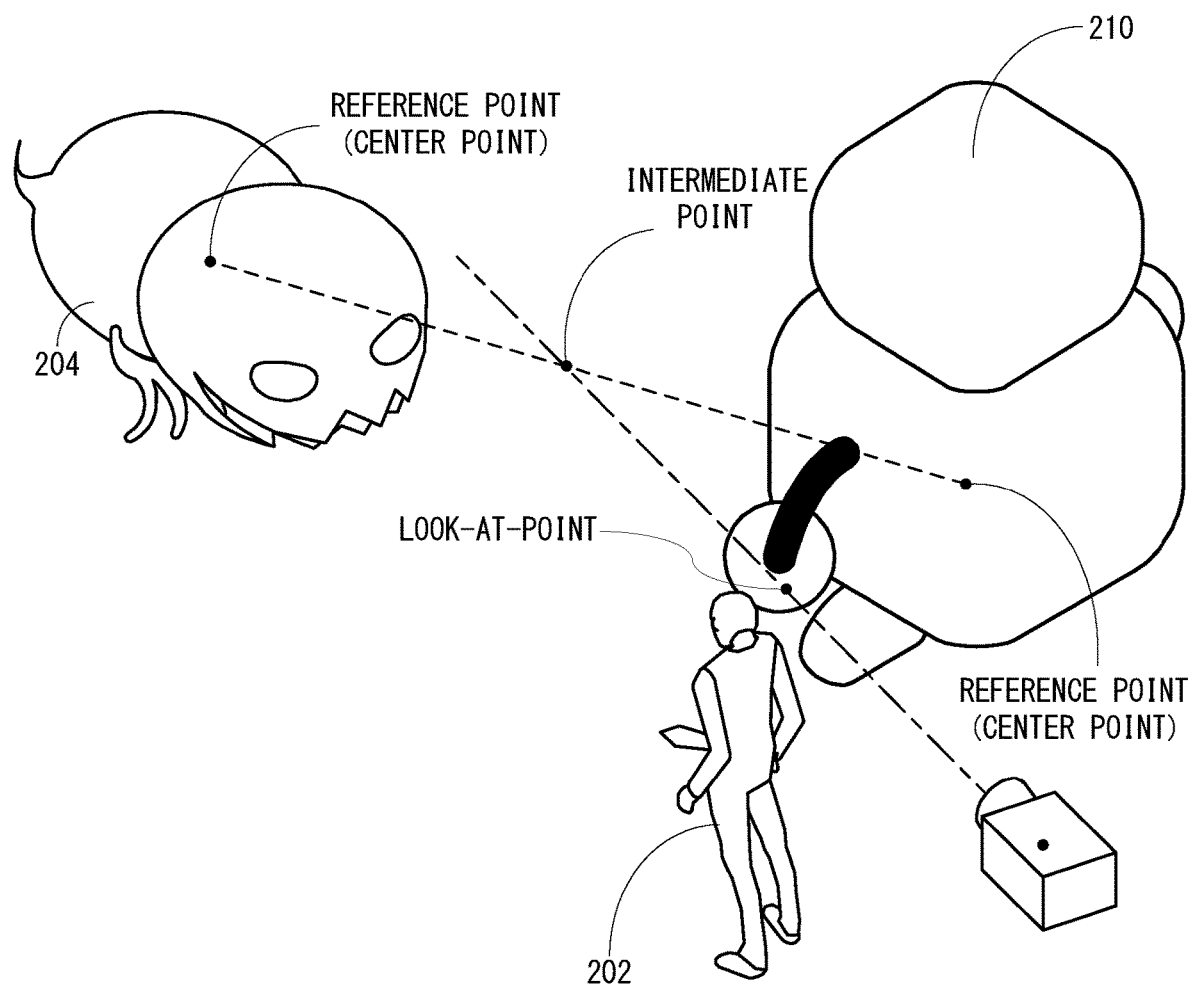
FIG. 16 is a view showing a non-limiting example positional relationship of the player character, an enemy character, the offensive character and the virtual camera in the virtual space, in case of being shown in FIG. 15.

FIG. 15 shows a non-limiting example game screen 200 corresponding to a game image when the enemy character 204 further appears in the second operation mode. FIG. 16 shows a non-limiting example situation that the virtual space in case of displaying the game screen 200 shown in FIG. 15 is viewed from diagonally above the player character 202, the enemy character 204, the offensive character 210 and the virtual camera 250.

As shown in FIG. 15 and FIG. 16, in the second operation mode, if the enemy character 204 appears in the virtual space, the virtual camera 250 is moved to the position capturing the fourth predetermined position that is determined by the enemy character 204 and the offensive character 210 (for example, intermediate position between the two characters). However, the position of the look-at-point remains the third predetermined position, and the direction of the virtual camera 250 remains the third predetermined direction.

In addition, it does not need to limit the fourth predetermined position to the intermediate position between two bodies of the enemy character 204 and the offensive character 210, and the fourth predetermined position may be a position capable of capturing the enemy character 204, for example, the reference point set on the enemy character 204.

Therefore, in the second operation mode, when the enemy character 204 appears, the virtual camera 250 is controlled so that the player character 202, the enemy character 204 and the offensive character 210 are fit in the field angle of the virtual camera 250 as much as possible.

Thus, in the second operation mode, when the enemy character 204 does not appear in the virtual space, the direction of the virtual camera 250 is set in the third predetermined direction in the camera coordinate system, and the distance between the player character 202 and the offensive character 210 is the first predetermined distance, the sixth predetermined distance or the seventh predetermined distance, and the position of the virtual camera 250 is set to be capable of capturing centering on the reference point of the offensive character 210, that is, the third predetermined position. Moreover, when the enemy character 204 appears in the virtual space, in different from a case where the enemy character 204 does not appear in the virtual space, the position of the virtual camera 250 is set to be capable of capturing centering on the intermediate position between the reference point of the enemy character 204 and the reference point of the offensive character 210, that is, the fourth predetermined position. That is, in the second operation mode, when the enemy character 204 does not appear, the line of sight of the virtual camera 250 is made to follow the positions of the player character 202 and the offensive character 210, and when the enemy character 204 appears, the line of sight of the virtual camera 250 is made to follow the positions of the player character 202, the enemy character 204 and the offensive character 210.

In addition, in the second operation mode, since the horizontal distance between the player character 202 and the virtual camera 250 is changed based on the distance between the virtual camera 250 and the offensive character 210 as described above, in different from the first operation mode, the horizontal distance between the player character 202 and the virtual camera 250 is made not to be changed regardless whether the enemy character 204 appears. However, the horizontal distance between the player character 202 and the virtual camera 250 may be changed according to whether the enemy character 204 appears, similar to the first operation mode.

Returning to FIG. 15, in the second operation mode, the offensive character 210 attacks the enemy character 204 according to an operation of the player, but when the offensive character 210 is during attacking the enemy character 204, it is possible to reserve a content of its attack. That is, in this embodiment, when the main body apparatus 2 detects an attack operation in a case where the offensive character 210 is attacking the enemy character 204, the main body apparatus 2 will hold a content of the attack of the offensive character 210 corresponding to the detected attack operation.

In the game screen 200 shown in FIG. 15, a display portion 220 that displays the contents of the attacks designated by an operation of the player is provided. A left side of the display portion 220 displays an image showing the content of the attack currently performed, and a right side of the display portion 220 displays an image showing the content of an attack to be performed next. That is, in this embodiment, a single content of the attack content is held. In an example shown in FIG. 15, an image showing a punch is displayed on the left side, and an image showing a kick is displayed on the right side.

If the attack currently performed is completed, that is, if the currently attack action is all ended, the image of the left side of the display portion 220 is replaced with the image currently displayed on the right side of the display portion 220, and the image currently displayed on the right side of the display portion 220 is deleted. However, a content of attack is further designated, an image showing the content of attack is displayed on the right side of the display portion 220.

Since the content of attack is thus held, in a case where the operation mode is changed (returned) from the second operation mode to the first operation mode if the ZL-button 39 is turned off, when all the attack of the offensive character 210 have not been completed, the offensive character 210 is deleted after all completion. Since the player character 202 is operated according to an operation of the player to attack the enemy character 204 in the first operation mode, when the offensive character 210 continues to perform the attack also in the first operation mode, it is possible to attack the enemy character 204 by both the player character 202 and the offensive character 210. The offensive character 210 is deleted from the virtual space when all the attack is completed.

Also in this case, the player character 202 and the offensive character 210 can perform attack actions simultaneously, temporarily. Moreover, when the content of the attack of the offensive character 210 is held, it is possible to prolong the period of time that the both characters 202 and 210 perform the attack actions simultaneously, temporarily.

However, in the second operation mode, even in a case where the ZL-button 39 is not turned off, when the player character 202 is attacked by the enemy character 204, the operation mode is changed from the second operation mode to the first operation mode.

Therefore, since the virtual camera 250 is controlled so that both characters come into the field of view of the virtual camera 250 as described above in the specification that the offensive character 210 is deleted if the player character 202 receives the attack, it is possible to operate the offensive character 210 while grasping whether it is likely attacked by the enemy character 204.

Moreover, also in the second operation mode, when a plurality of enemy characters 204 appear, it is possible for the player to lock on one enemy character 204 by depressing the analog stick 52 and attack the locked-on enemy character 204. At this time, the distance between the player character 202 and the virtual camera 250 is set to the sixth predetermined distance or the seventh predetermined distance. Moreover, the direction of the virtual camera 250 is set in the fourth predetermined direction in the camera coordinate system. As an example, in the fourth predetermined direction, the pitch angle is 5 (five) degrees upward, and the roll angle and the yaw angle are both 0 (zero) degrees, and these angles are the same as those of the time of lock-on in the first operation mode. Furthermore, the look-at-point of the virtual camera 250 remains the third predetermined position, and the line of sight is set so as to pass the third predetermined position and the fourth predetermined position. Therefore, when the one enemy character 204 is locked on, the player character 202, the whole or a portion of the locked-on enemy character 204 and the whole or a portion of the offensive character 210 are included in a single game image. In addition, in other embodiments, it does not need to perform lock-on in the second operation mode.

Although detailed description is omitted, in the second operation mode, when a plurality of enemy characters 204 are appearing, the fourth predetermined position is determined based on the enemy character 204 nearest to the player character 202 or the offensive character 210 and the offensive character 210.

Moreover, although detailed description is omitted, in the second operation mode, the player can select the type of the offensive character 210 to be used by depressing the operation button 33, the operation button 35 or the operation button 36. Moreover, the player can change equipment (for example, weapon) of the offensive character 210 by depressing the L-button 38. Furthermore, the player can make the offensive character 210 retreat from the battle with the enemy character 204 by depressing the ZR-button 61.

Figure 17:
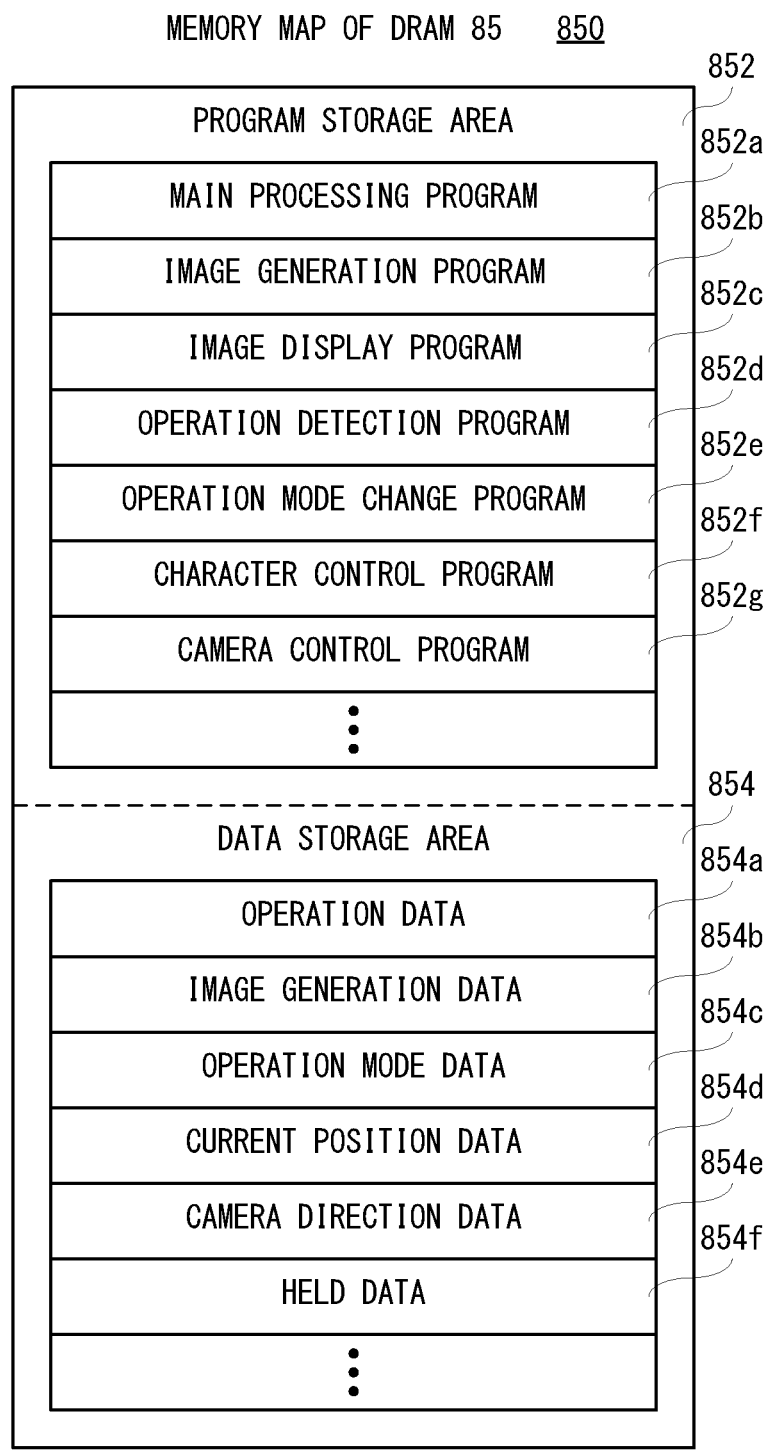
FIG. 17 is a view showing a non-limiting example memory map of a DRAM of the main body apparatus shown in FIG. 6.

FIG. 17 is a view showing a non-limiting example memory map 850 of the DRAM 85 shown in FIG. 6. As shown in FIG. 17, the DRAM 85 includes a program storage area 852 and a data storage area 854. The program storage area 852 is stored with a program of a game application (i.e., game program). As shown in FIG. 17, the game program includes a main processing program 852*a*, an image generation program 852*b*, an image display program 852*c*, an operation detection program 852*d*, an operation mode change program 852*e*, a character control program 852*f*, a camera control program 852*g*, etc. However, a function of displaying images such as a game image is a function that the main body apparatus 2 is provided with. Therefore, the image display program 852*c* is not included in the game program.

Although detailed description is omitted, at a proper timing after a power of the main body apparatus 2 is turned on, a part or all of each of the programs 852*a*-852*g* is read from the flash memory 84 and/or a storage medium attached to the slot 23 to be stored in the DRAM 85. However, a part or all of each of the programs 852*a*-852*g* may be acquired from other computers capable of performing communication with the main body apparatus 2.

The main processing program 852*a* is a program for executing overall game processing of a virtual game of this embodiment. The image generation program 852*b* is a program for generating, using image generation data 854*b* described later, display image data corresponding to various kinds of images such as a game image. The image display program 852*c* is a program for outputting to a display device the display image data generated according to the image generation program 852*b*. Therefore, the images corresponding to the display image data (i.e., the game screen 200 etc.) are displayed on the display device such as the display 12.

The operation detection program 852*d* is a program for acquiring the operation data 854*a* from the left controller 3 or/and the right controller 4. The operation mode change program 852*e* is a program for changing the operation mode between the first operation mode and the second operation mode based on an operation of the player and a fact that the player character 202 is attacked.

The character control program 852*f* is a program for controlling a movement and an arbitrary action of the player character 202 or/and the offensive character 210 with an operation of the player, and for controlling a movement and an arbitrary action of the non-player character including the enemy character 204 without an operation of the player. Moreover, the character control program 852*f* is a program also for making the offensive character 210 appear into the virtual space or be deleted from the virtual space according to an operation of the player and a fact that the player character 202 is attacked.

The camera control program 852*g* is a program for controlling a direction and a position of the virtual camera 250.

In addition, the program storage area 852 is further stored with a sound output program for outputting a sound such as a BGM, a communication program for performing communication with other apparatuses, a backup program for storing data in a nonvolatile storage medium such as the flash memory 84, etc.

Moreover, the data storage area 854 is stored with the operation data 854*a*, the image generation data 854*b*, operation mode data 854*c*, current position data 854*d*, camera direction data 854*e*, held data 854*f*, etc.

The operation data 854*a* is operation data received from the left controller 3 or/and the right controller 4. In this embodiment, when the main body apparatus 2 receives the operation data from both of the left controller 3 and the right controller 4, the main body apparatus 2 stores the operation data 854*a* with classifying into the left controller 3 and the right controller 4.

The image generation data 854*b* is data required for generating the display image data, such as polygon data and texture data. The operation mode data 854*c* is data for determining the first operation mode or the second operation mode, and specifically, is data of the identification information on the current operation mode.

The current position data 854*d* is data of the position coordinate in a current frame on each of characters or objects movable in the virtual space, such as the player character 202, the enemy character 204, the offensive character 210 and the virtual camera 250.

The camera direction data 854*e* is data on a direction of the virtual camera 250 in the camera coordinate system. The held data 854*f* is data, for the offensive character 210, on the content of the attack of currently performed and the content of the attack to be performed next. However, there is an occasion that no content of attack to be performed next.

Although illustration is omitted, the data storage area 854 is stored with other data, and is provided with flags and timer(s) (counter(s)).

Figure 18:
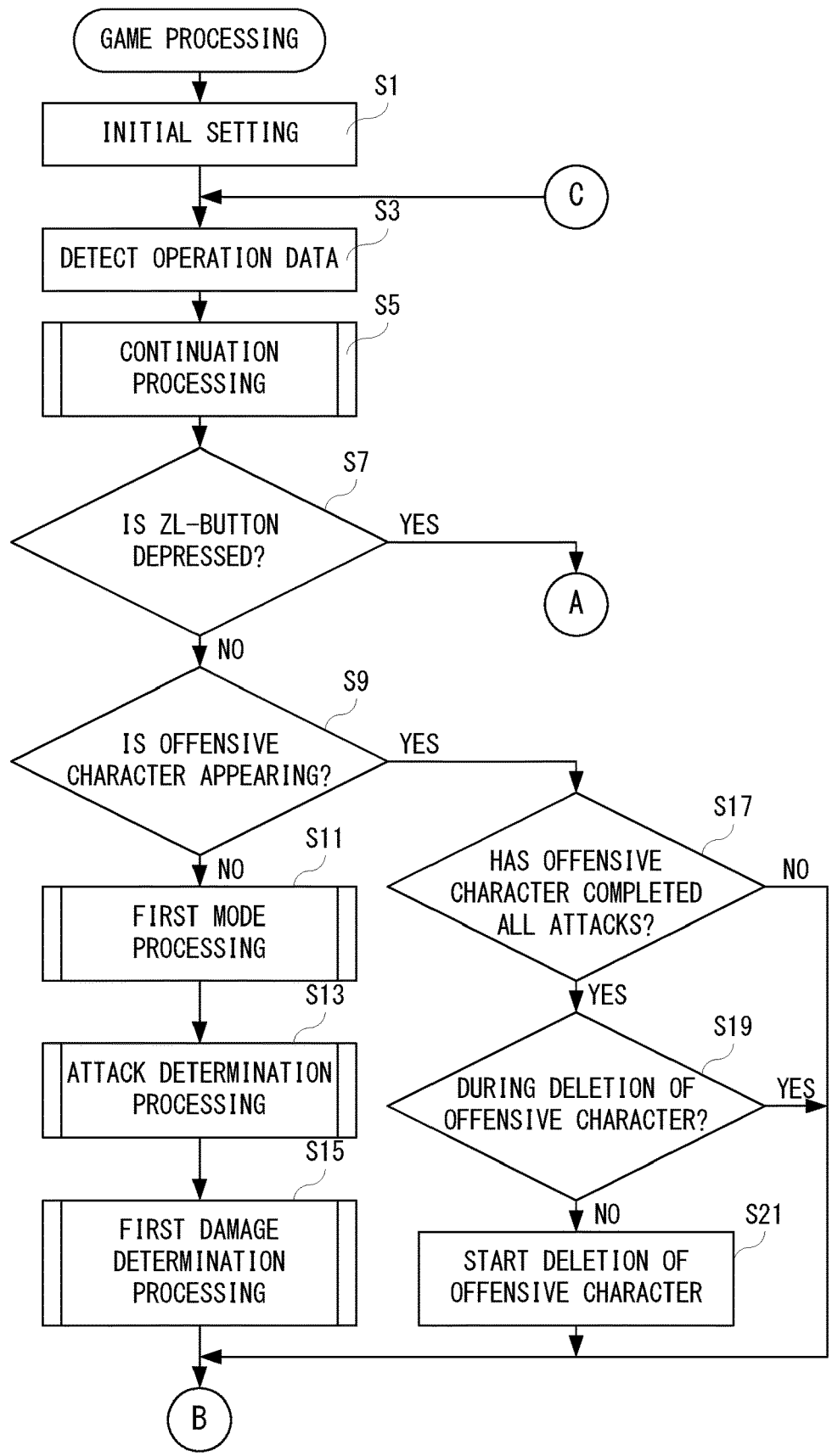
FIG. 18 is a flowchart showing a part of non-limiting example game processing of a processor of the main body apparatus shown in FIG. 6.
Figure 19:
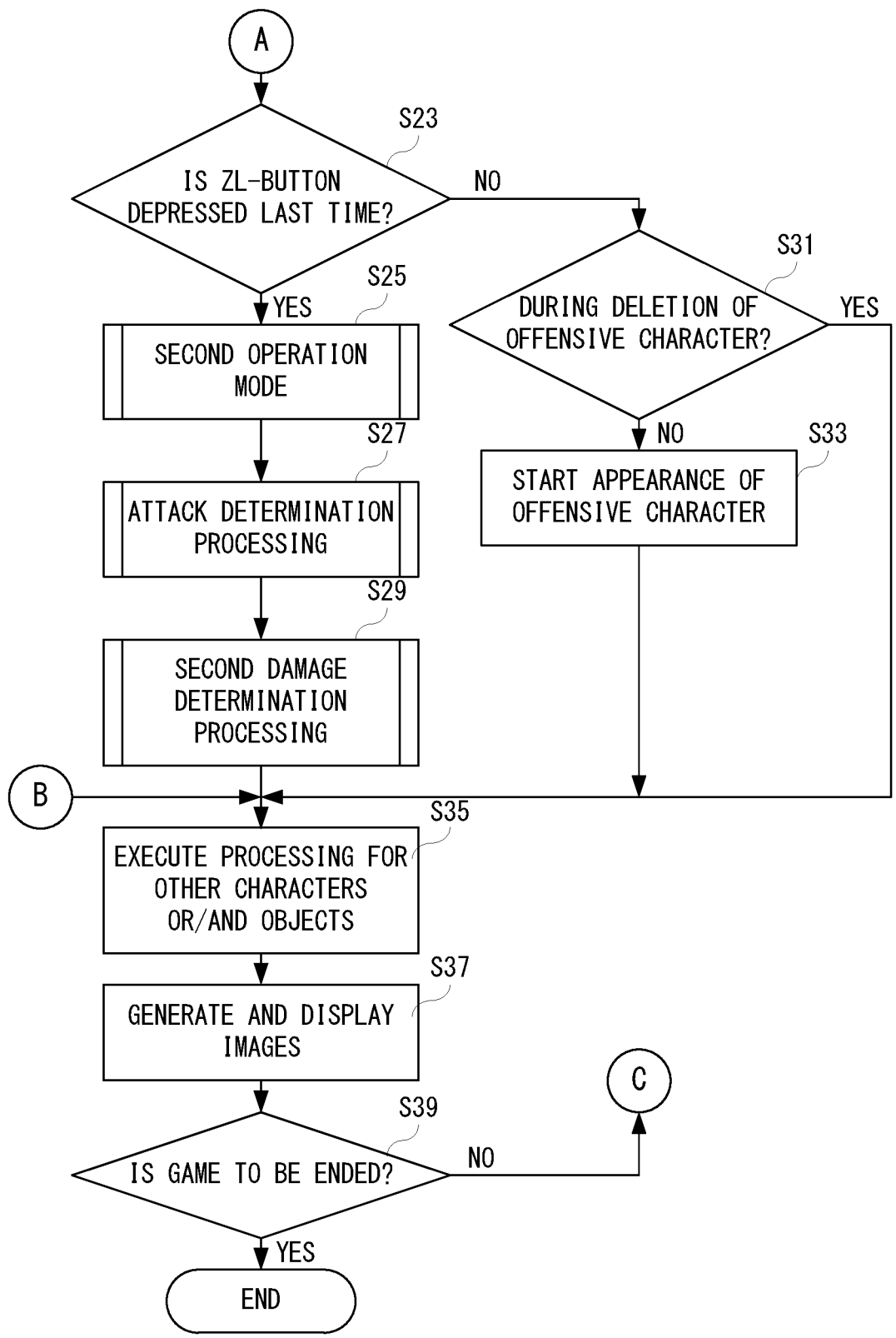
FIG. 19 is a flowchart showing another part of the non-limiting example game processing of the processor of the main body apparatus shown in FIG. 6, following FIG. 18.

FIG. 18 and FIG. 19 are flowcharts showing non-limiting example processing of the game program (i.e., "game processing") by the processor 81 (or computer) of the main body apparatus 2. In the following, although the game processing and various processing included therein will be described using FIG. 18-FIG. 27, duplicate description on steps executing the same or similar processing will be omitted.

However, processing of respective steps of the flowcharts shown in FIG. 18-FIG. 27 are mere examples, and if the same or similar result is obtainable, an order of the respective steps may be exchanged. Moreover, in this embodiment, it will be described that the processor 81 executes the processing of the respective steps of the flowcharts shown in FIG. 18-FIG. 27 basically; however, some steps may be executed by a processor(s) or/and a dedicated circuit(s) other than the processor 81.

When the power of the main body apparatus 2 is turned on, prior to execution of the game processing, the processor 81 executes a boot program stored in a boot ROM not shown, whereby respective units including the DRAM 85, etc. are initialized. The main body apparatus 2 starts the game processing if execution of the game program of this embodiment is instructed by the player.

As shown in FIG. 18, if the game processing is started, the processor 81 executes initial setting in a step S1. Here, the processor 81 arranges the player character 202, the non-player character, the background object and the virtual camera 250 in respective initial positions in the virtual space. However, when starting the game from the continuation of the last time, the player character 202, the non-player character, the background object and the virtual camera 250 are arranged in the respective positions at the time of being saved. At this time, the coordinate data of the initial positions or the positions at the time of being saved of the player character 202, the non-player character and virtual camera 250 are stored in the data storage area 854 as the current position data 854d. Moreover, the direction of the virtual camera 250 is set to a direction determined with the camera coordinate system (here, the first direction). Moreover, the processor 81 sets the identification information of the operation mode indicated by the operation mode data 854c to the identification information of the first operation mode. In addition, although detailed description is omitted, the processor 81 sets the physical power values of the player character 202 and the enemy character 204 at the maximum values, respectively. However, the processor 81 sets the physical power value of the offensive character 210 to the maximum value when making this offensive character 210 initially appear.

In a next step S3, the operation data is detected. Subsequently, in a step S5, continuation processing (see FIG. 20) described later is executed. In a next step S7, it is determined whether the ZL-button 39 is depressed. That is, it is determined whether data indicative of depression of the ZL-button 39 is included in the operation data detected in the step S3.

If "YES" is determined in the step S7, that is, if the ZL-button 39 is depressed, it is determined that the second operation mode is set, and the process proceeds to a step S21 shown in FIG. 19. On the other hand, if "NO" is determined in the step S7, that is, if the ZL-button 39 is not depressed, it is determined that the first operation mode is set, and it is determined, in a step S9, whether the offensive character 210 appears in the virtual space.

If "NO" is determined in the step S9, that is, if the offensive character 210 does not appear in the virtual, first operation mode processing (see FIG. 21 and FIG. 22) described later is executed in a step S11, attack determination processing (see FIG. 23) described later is executed in a step S13, and first damage determination processing (see FIG. 24) described later is executed in a step S15, and the process proceeds to a step S35 shown in FIG. 19.

On the other hand, if "YES" is determined in the step S9, that is, if the offensive character 210 appears in the virtual space, it is determined, in a step S17, whether the offensive character 210 completes all the attacks. That is, the processor 81 determines whether the offensive character 210 ends the action for all the attack including an attack being held.

If "NO" is determined in the step S17, that is, if there is the attack that is not ended, the proceeds to the step S35. On the other hand, if "YES" is determined in the step S17, that is, if the offensive character 210 completes all the attacks, it is determined, in a step S19, whether it is during deletion of the offensive character 210.

If "YES" is determined in the step S19, that is, if it is during deletion of the offensive character 210, the process proceeds to the step S35. On the other hand, if "NO" is determined in the step S19, that is, if it is not during deletion of the offensive character 210, deletion of the offensive character 210 is started in a step S21, and then, the process proceeds to the step S35.

As shown in FIG. 19, in a step S23, it is determined whether the ZL-button 39 is depressed last time. That is, the processor 81 determines whether the data indicative of depression of the ZL-button 39 is included in the operation data detected last time. If "YES" is determined in the step S23, that is, if the ZL-button 39 is depressed last time, it is determined that the second operation mode is still continued, and second operation mode processing (see FIG. 25 and FIG. 26) described later is executed in a step 25, the attack determination processing (see FIG. 23) is executed in a step S27, and second damage determination processing (see FIG. 27) described later is executed in a step S29, and the process proceeds to the step S35.

On the other hand, if "NO" is determined in the step S23, that is, if the ZL-button 39 is not depressed last time, it is determined that the second operation mode is set this time, and it is determined, in a step S31, whether it is during deletion of the offensive character 210. If "YES" is determined in the step S31, the process proceeds to the step S35. On the other hand, if "NO" is determined in the step S31, the appearance of the offensive character 210 is started in a step S33, and the process proceeds to the step S35.

In the step S35, processing for other characters or/and objects is executed. Here, the processor 81 makes the non-player character including the enemy character 204 perform actions, and the background object change.

In a next step S37, a game image is generated based on the characters and objects arranged in the virtual space through the above-described processing. The generated game image is displayed on the display 12. Then, it is determined whether the game is to be ended in a step S39. Here, the processor 81 determines whether the game is cleared or the game is over. In addition, when the operation data detected in the step S3 indicates an instruction to end the game, even if it is in the middle of the game processing, the game is forcibly ended. Moreover, although illustration is omitted, a sound (hereinafter, referred to as "game sound") required for the game is generated simultaneously or almost simultaneously with the processing in the step S37, and the generated game sound is outputted from the speaker 88 (or sound input/output terminal 25).

If "NO" is determined in the step S39, that is, if it is not the end of game, the process returns to the step S3 shown in FIG. 18. On the other hand, if "YES" is determined in the step S39, that is, if it is the end of game, the game processing is ended.

Figure 20:
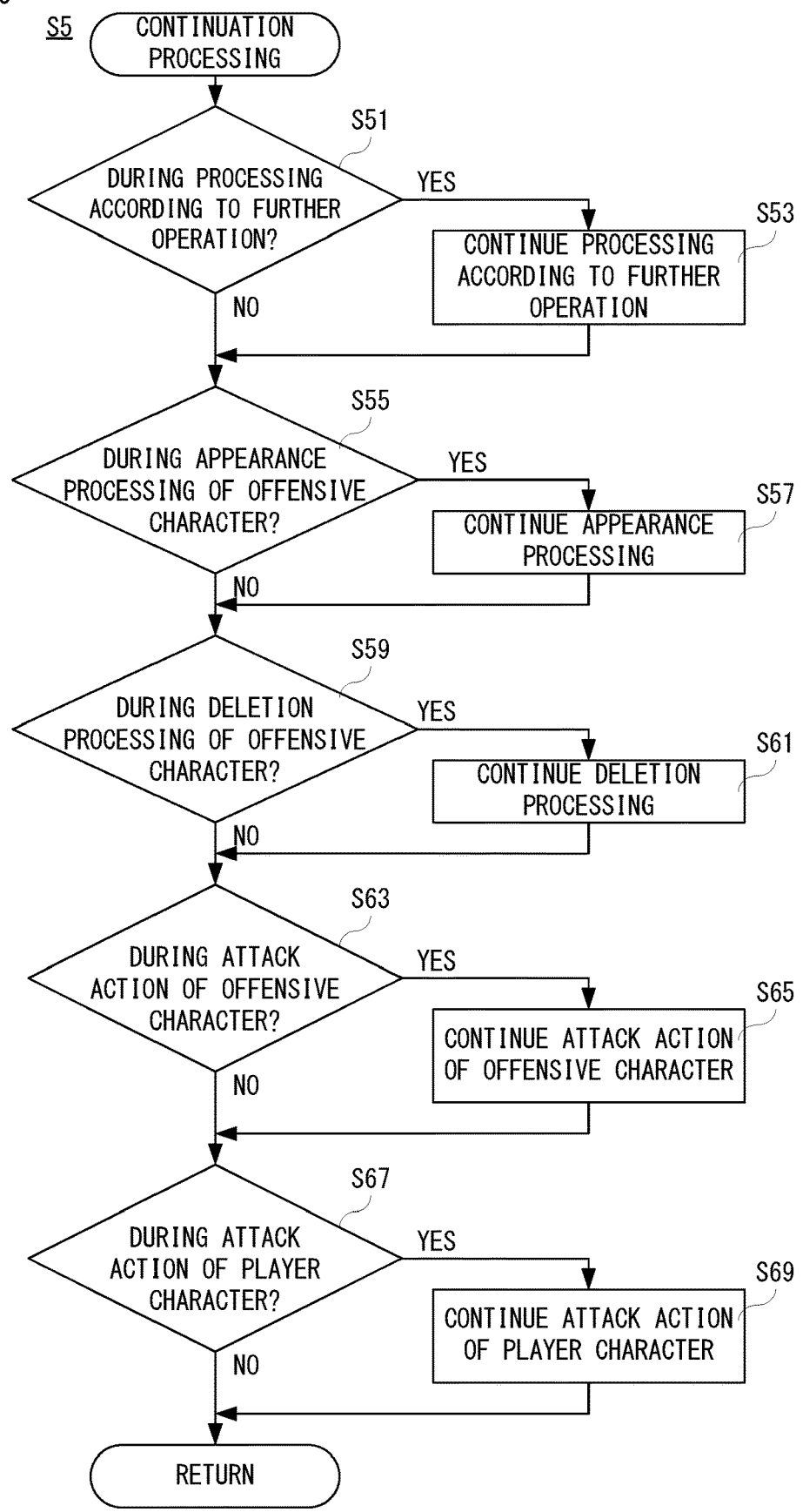
FIG. 20 is a flowchart showing non-limiting example continuation processing of the processor of the main body apparatus shown in FIG. 6.

FIG. 20 is a flowchart showing non-limiting example continuation processing in the step S5 shown in FIG. 18. As shown in FIG. 20, if the continuation processing is started, the processor 81 determines, in a step S51, whether is during execution of processing according to a further operation for the player character, that is, the player character 202 or the offensive character 210.

If "YES" is determined in the step S51, that is, if it is during execution of the processing according to the further operation, the processing according to the further operation for the player character 202 or the offensive character 210 is continued in a step S53, and the process proceeds to a step S55. As an example, in the first operation mode, in the step S53, the processor 81 advances a frame of an animation (i.e., animation frame) of a situation that the player character 202 avoids the attack of the enemy character 204. Moreover, in the second operation mode, in the step S53, the processor 81 advances an animation frame of a situation that the offensive character 210 is forcibly escaped from the enemy character 204.

On the other hand, if "NO" is determined in the step S51, that is, if it is not during execution of the processing according to the further operation, it is determined, in the step S55, whether it is during execution of appearance processing of the offensive character 210.

If "YES" is determined in the step S55, that is, if it is during execution of the appearance processing of the offensive character 210, in a step S57, the appearance processing of the offensive character 210 is continued, that is, an animation frame of an animation that makes the offensive character 210 appear in the virtual space is made to advance, and then, the process proceeds to a step S59. On the other hand, if "NO" is determined in the step S55, that is, if it is not during execution of the appearance processing of the offensive character 210, it is determined, in the step S59, whether it is during execution of deletion process of the offensive character 210.

If "YES" is determined in the step S59, that is, if it is during execution of the deletion processing of the offensive character 210, in a step S61, the deletion processing of the offensive character 210 is continued, that is, an animation frame of an animation that makes the offensive character 210 disappear from the virtual space is made to advance, and then, the process proceeds to a step S63. On the other hand, if "NO" is determined in the step S59, that is, if it is not during execution of the deletion processing of the offensive character 210, it is determined, in the step S63, whether it is during execution of an attack action of the offensive character 210.

If "YES" is determined in the step S63, that is, if it is during execution of the attack action of the offensive character 210, in a step S65, the attack action of the offensive character 210 is continued, that is, an animation frame of an animation according to the attack action by the offensive character 210 is made to advance, and then, the process proceeds to a step S67. On the other hand, if "NO" is determined in the step S63, that is, if it is not during execution of the attack action of the offensive character 210, it is determined, in the step S67, whether it is during execution of an attack action of the player character 202.

If "YES" is determined in the step S67, that is, if it is during execution of the attack action of the player character 202, in a step S69, the attack action of the offensive character 210 is continued, that is, an animation frame of an animation according to the attack action by the player character 202 is made to advance, and then, the process returns to the game processing. On the other hand, if "NO" is determined in the step S67, that is, if it is not during execution of the attack action of the player character 202, the process returns to the game processing.

Figure 21:
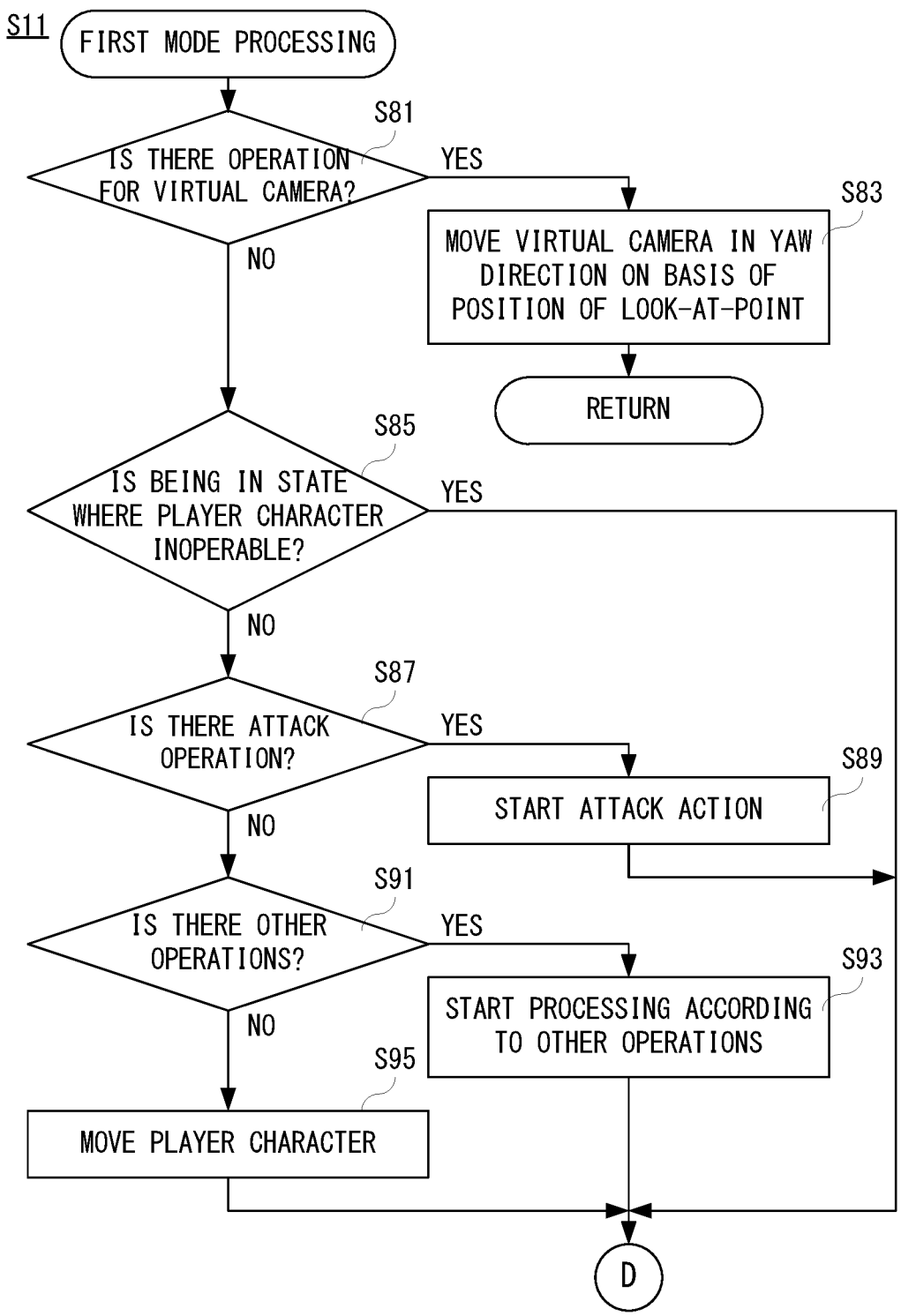
FIG. 21 is a flowchart showing a part of non-limiting example first operation mode processing of the processor of the main body apparatus shown in FIG. 6.
Figure 22:
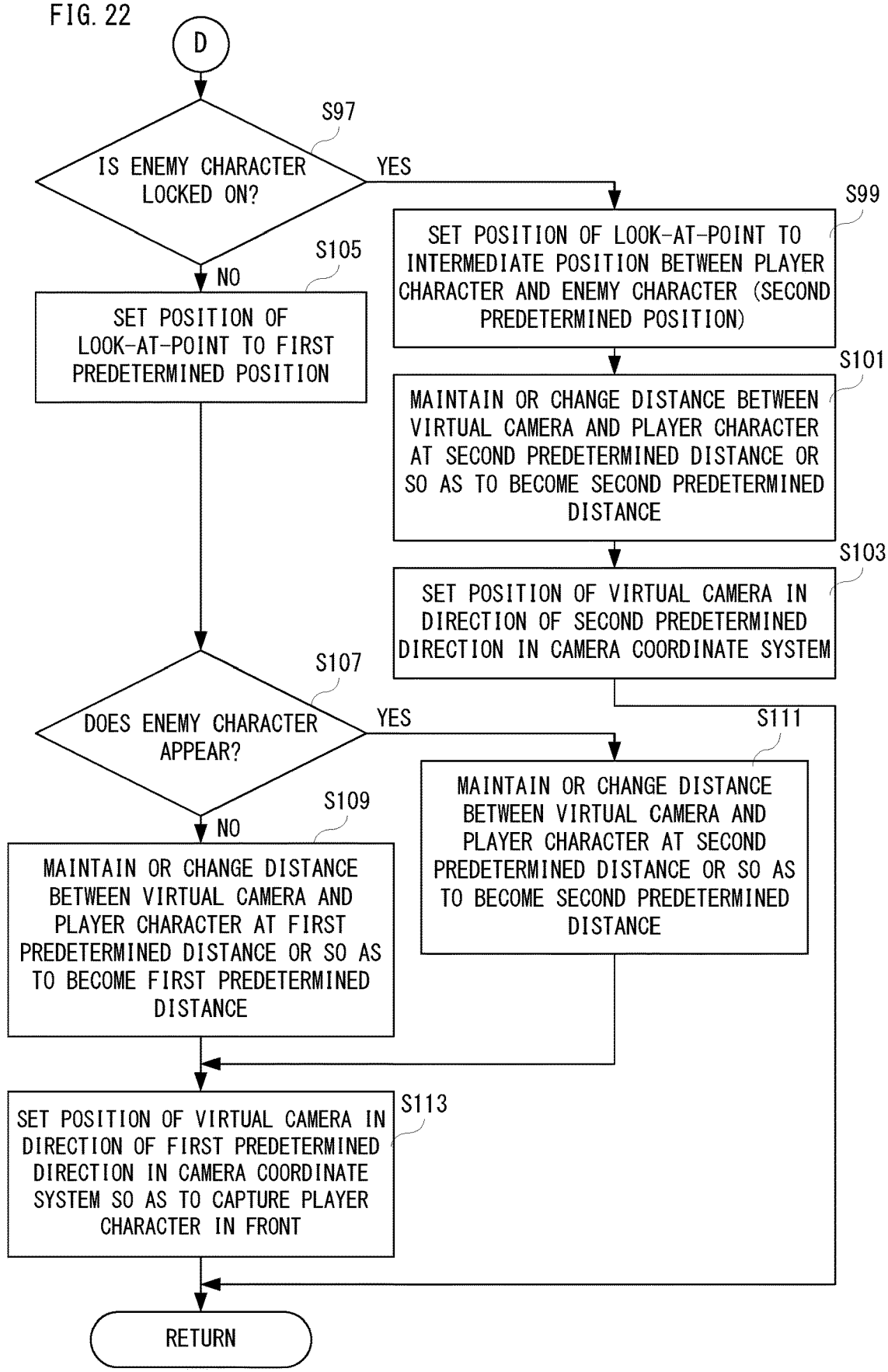
FIG. 22 is flowchart showing another part of the non-limiting example first operation mode processing of the processor of the main body apparatus shown in FIG. 6, following FIG. 21.

FIG. 21 and FIG. 22 are flowcharts showing non-limiting example first operation mode processing in the step S11 shown in FIG. 18. If the first operation mode processing is started as shown in FIG. 21, it is determined, in a step S81, whether there is any operation for the virtual camera 250. Here, the processor 81 determines whether data indicating that the analog stick 52 is tilted is included in the operation data detected in the step S3.

If "YES" is determined in the step S81, that is, if there is an operation for the virtual camera 250, in a step S83, the virtual camera 250 is moved in a yaw direction on the basis of the position of the look-at-point, and the process returns to the game processing shown in FIG. 18 and FIG. 19. That is, in the step S83, the virtual camera 250 is turned to the direction corresponding to a direction that the analog stick 52 is tilted centering on the position of the look-at-point. The same applies to a step S173 of second operation mode processing described later.

On the other hand, if "NO" is determined in the step S81, that is, if there is no operation for the virtual camera 250, it is determined, in a step S85, whether it is in a state that the player character 202 is inoperable. Here, it is determined whether the player character 202 is in an inoperable state, such as during an attack to the enemy character 204 (i.e., continuation of the attack action), during reception of an attack from the enemy character 204, or during appearance of the boss enemy character 204.

If "YES" is determined in the step S85, that is, if it is in the inoperable state of the player character 202, the process proceeds to a step S97 shown in FIG. 22. On the other hand, if "NO" is determined in the step S85, that is, if it is not in the inoperable state of the player character 202, it is determined, in a step S87, whether there is any attack operation. Here, the processor 81 determines whether data indicating that at least one of the A-button 53, the B-button 54, the X-button 55 and the Y-button 56 is depressed is included in the operation data detected at step S3.

If "YES" is determined in the step S87, that is, if there is an attack operation, an attack action according to the attack operation is started in a step S89, and the process proceeds to the step S97. On the other hand, if "NO" is determined in the step S87, that is, if there is no attack operation, it is determined, in a step S91, whether there is a further operation. Here, the processor 81 determines whether data indicative of depression of the operation button 33, the operation button 35, the operation button 36, the L-button 38 or the ZR-button 61 is included the operation data detected in the step S3. Here, the further operation includes an operation of changing the type of the offensive character 210, an operation of changing equipment (for example, weapon) of the player character 202, and an operation of making the player character 202 avoid the attack of the enemy character 204.

If "YES" is determined in the step S91, that is, if there is a further operation, processing according to the further operation is started in a step S93, and the process proceeds to the step S97. On the other hand, if "NO" is determined in the step S91, that is, if there is no further operation, the player character 202 is moved in a direction that the analog stick 32 is tilted in a step S95, and he process proceeds to the step S97. However, when the analog stick 32 is not tilted, the player character 202 is not moved in the step S95 (i.e., a moving amount=0 (zero)).

As shown in FIG. 22, in the step S97, it is determined whether the enemy character 204 is locked-on. Here, it is determined whether data indicating that the analog stick 52 is depressed is included in the operation data detected in the step S3.

If "YES" is determined in the step S97, that is, if the enemy character 204 is locked-on, in a step S99, the position of the look-at-point is set to the intermediate position between the player character 202 and the enemy character 204, that is, the second predetermined position. In a subsequent step S101, the distance between the virtual camera 250 and the player character 202 remains the second predetermined distance (for example, 4 (four) meters) or is changed so as to become the second predetermined distance. In the step S101, if the distance between the virtual camera 250 and the player character 202 is not the second predetermined distance, the virtual camera 250 is moved by predetermined distance (for example, 15 centimeters) at a time so as to approach the second predetermined distance. Hereinafter, the same applies to a case of moving the virtual camera 250, such as a case of changing the distance between the virtual camera 250 and the player character 202 so as to become a predetermined distance. Then, in a step S103, the position of the virtual camera 250 is set in the second predetermined direction in the camera coordinate system, and then, the process returns to the game processing.

On the other hand, if "NO" is determined in the step S97, that is, if the enemy character 204 is not locked-on, the position of the look-at-point is set to the first predetermined position in a step S105, and it is determined, in a step S107, whether the enemy character 204 appears in the virtual space.

If "NO" is determined in the step S107, that is, if the enemy character 204 does not appear in the virtual space, the distance between the virtual camera 250 and the player character 202 remains the first predetermined distance (for example, 3 (three) meters) or is changed so as to become the first predetermined distance in a step S109, and then, the process proceeds to a step S113. On the other hand, if "YES" is determined in the step S107, that is, if the enemy character 204 appears in the virtual space, the distance between the virtual camera 250 and the player character 202 remains the second predetermined distance or is changed so as to become the second predetermined distance in a step S111, and then, the process proceeds to the step S113.

In the step S113, the position of the virtual camera 250 is set in the second predetermined direction in the camera coordinate system so as to capture the player character in the front, and then, the process returns to the game processing.

In addition, in the step S103, the position of the virtual camera 250 is set in the distance with the player character 202 (i.e., horizontal distance) maintained or changed in the step S101.

Moreover, in the step S113, the position of the virtual camera 250 is set in the distance with the player character 202 (i.e., horizontal distance) maintained or changed in the step S109 or S111.

Figure 23:
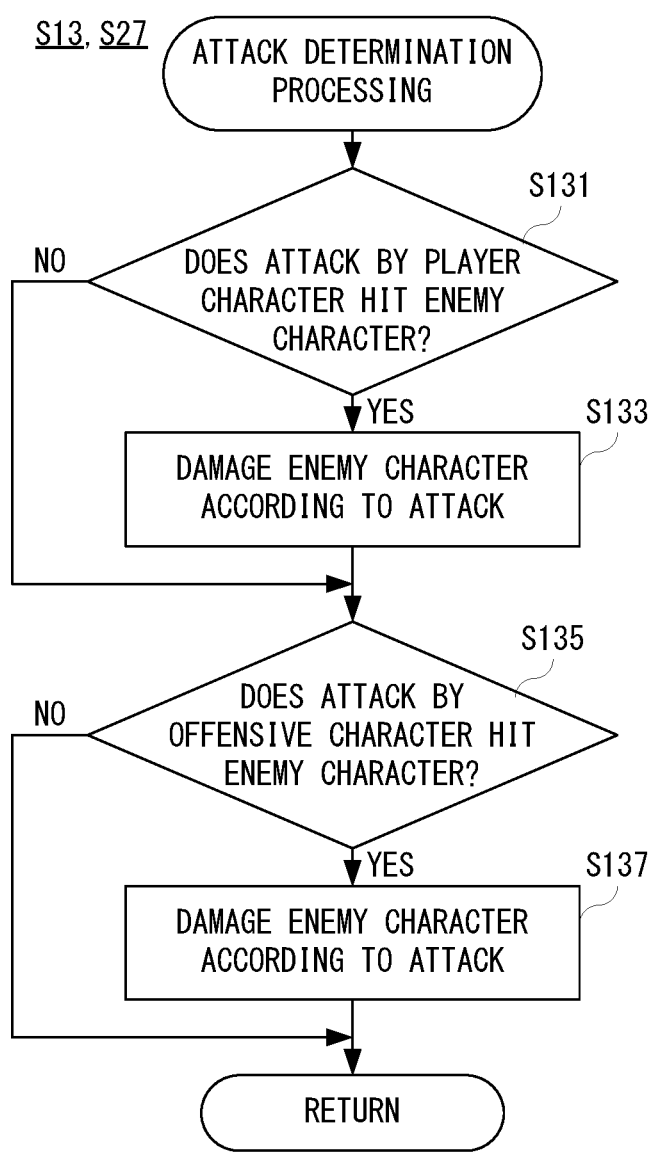
FIG. 23 is a flowchart showing non-limiting example attack determination processing of the processor of the main body apparatus shown in FIG. 6.

FIG. 23 is a flowchart showing non-limiting example attack determination processing of the step S23 shown in FIG. 18 and the step S27 shown in FIG. 19. As shown in FIG. 23, if starting the attack determination processing, the processor 81 determines, in a step S131, whether the attack of the player character 202 hits the enemy character 204. If "YES" is determined in the step S131, that is, if the attack of the player character 202 hits the enemy character 204, the enemy character 204 is damaged according to the attack in a step S133, and the process proceeds to a step S135. On the other hand, if "NO" is determined in the step S131, that is, if the attack of the player character 202 does not hit the enemy character 204, the process proceeds to the step S135.

In the step S135, it is determined whether the attack of the offensive character 210 hits the enemy character 204. If "YES" is determined in the step S135, that is, if the attack of the offensive character 210 hits the enemy character 204, the enemy character 204 is damaged according to the attack in a step S137, and the process returns to the game processing. On the other hand, if "NO" is determined in the step S135, that is, if the attack of the offensive character 210 does not hit the enemy character 204, the process returns to the game processing.

Figure 24:
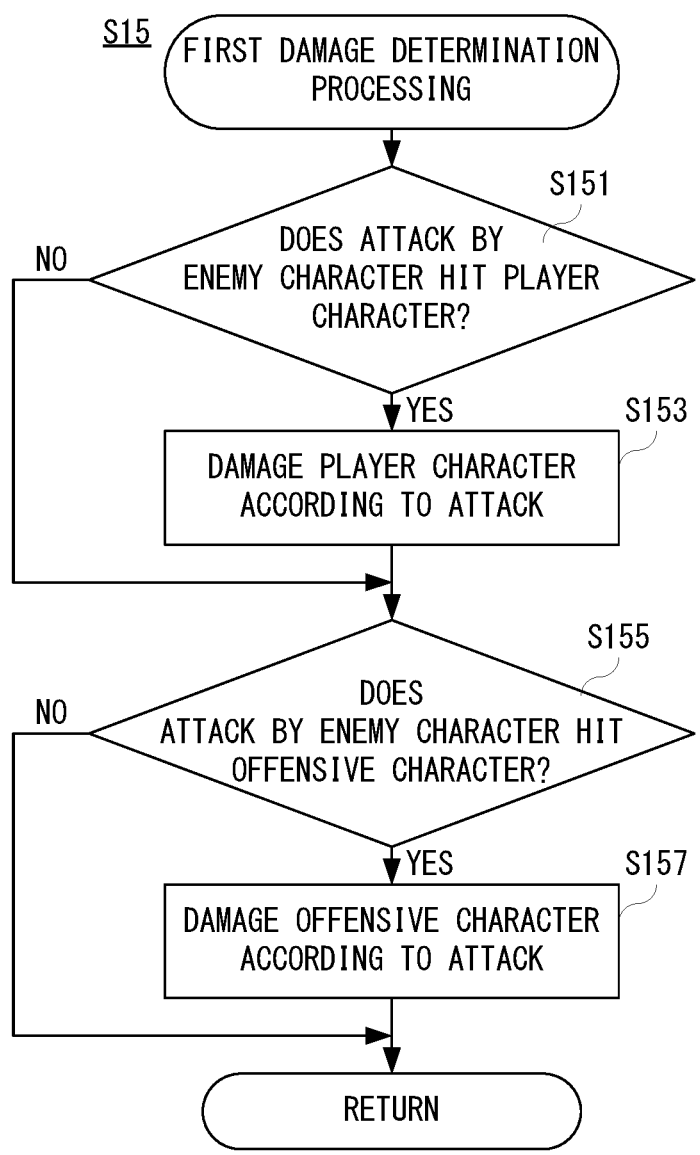
FIG. 24 is a flowchart showing non-limiting example first damage determination processing of the processor of the main body apparatus shown in FIG. 6.

FIG. 24 is a flowchart showing non-limiting example first damage determination processing of the step S15 shown in FIG. 18. As shown in FIG. 24, if starting the first damage determination processing, the processor 81 determines, in a step S151, whether the attack of the enemy character 204 hits the player character 202. If "YES" is determined in the step S151, that is, if the attack of the enemy character 204 hits the player character 202, the player character 202 is damaged according to the attack in a step S153, and the process proceeds to a step S155. If "NO" is determined in the step S151, that is, if the attack of the enemy character 204 does not hit the player character 202, the process proceeds to the step S155.

In the step S155, it is determined whether the attack of the enemy character 204 hits the offensive character 210. If "YES" is determined in the step S155, that is, if the attack of the enemy character 204 hits the offensive character 210, the offensive character 210 is damaged according to the attack in a step S157, and the process returns to the game processing. On the other hand, if "NO" is determined in the step S155, that is, if the attack of the enemy character 204 does not hit the offensive character 210, the process returns to the game processing. In addition, in other embodiments, the offensive character 210 may be prevented from being damaged by the attack of the enemy, and the steps S155 and S157 may not be executed. Similarly, steps S237 and S239 described later may be not executed.

Figure 25:
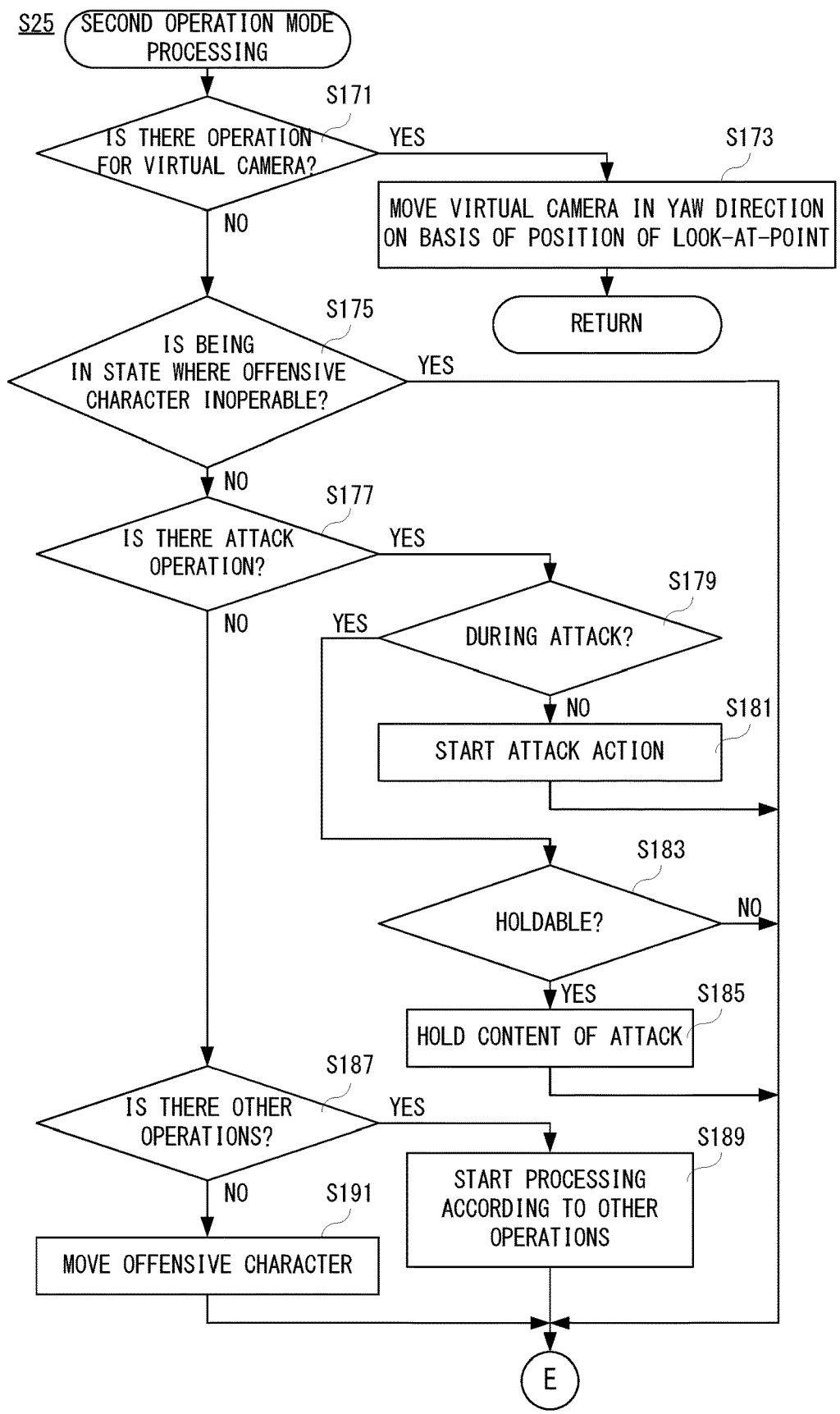
FIG. 25 is a flowchart showing a part of non-limiting example second operation mode processing of the processor of the main body apparatus shown in FIG. 6.
Figure 26:
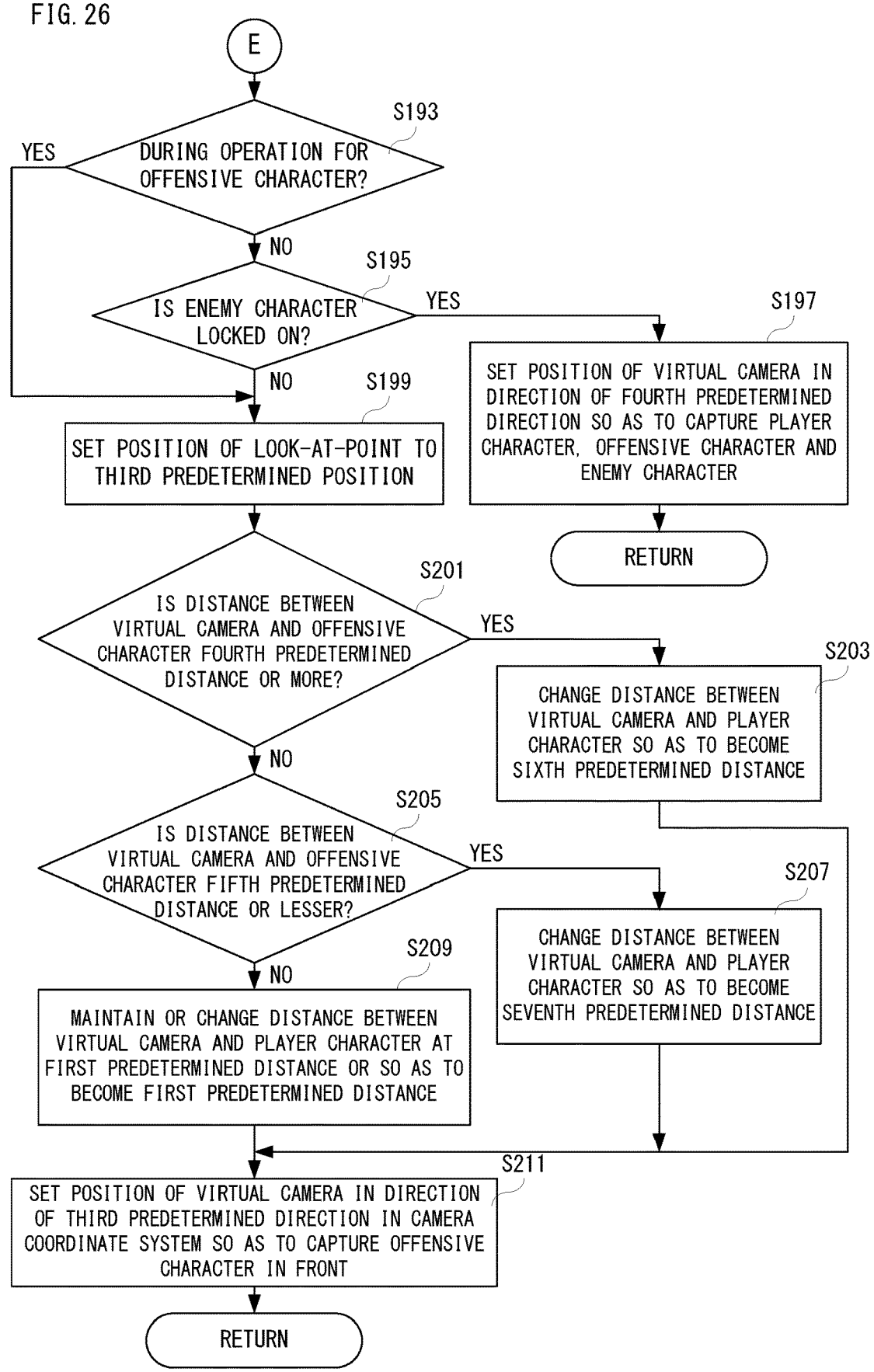
FIG. 26 is a flowchart showing another part of the non-limiting example second operation mode processing of the processor of the main body apparatus shown in FIG. 6, following FIG. 25.

FIG. 25 and FIG. 26 are flowcharts showing non-limiting example second mode processing of the step S25 shown in FIG. 19. As shown in FIG. 25, if starting the second mode processing, the processor 81 determines, in a step S171, whether there is an operation for the virtual camera 250. If "YES" is determined in the step S171, that is, if there is an operation for the virtual camera 250, in a step S173, the virtual camera 250 is moved in a yaw direction on the basis of the position of the look-at-point, and the process returns to the game processing shown in FIG. 18 and FIG. 19.

On the other hand, if "NO" is determined in the step S171, that is, if there is no operation for the virtual camera 250, it is determined, in a step S175, whether it is in a state that the offensive character 210 is inoperable. Here, it is determined whether the offensive character 210 is in an inoperable state, such as during an attack to the enemy character 204 (i.e., continuation of the attack action), during reception of an attack from the enemy character 204, or during appearance of the boss enemy character 204.

If "YES" is determined in the step S175, that is, if it is in the inoperable state of the offensive character 210, the process proceeds to a step S193 shown in FIG. 26. On the other hand, if "NO" is determined in the step S175, that is, if it is not in the inoperable state of the offensive character 210, it is determined, in a step S177, whether there is any attack operation. Here, the processor 81 determines whether data indicating that at least one of the A-button 53, the B-button 54, the X-button 55 and the Y-button 56 is depressed is included in the operation data detected at step S3.

If "YES" is determined in the step S177, that is, if there is an attack operation, it is determined, in a step S179, whether it is during the attack by the offensive character 210. If "NO" is determined in the step S179, that is, if it is not during the attack by the offensive character 210, an attack action of the offensive character 210 according to the attack operation is started in a step S181, and the process proceeds to the step S193. On the other hand, if "YES" is determined in the step S179, that is, if it is during the attack by the offensive character 210, it is determined, in a step S183, the content of the attack can be held.

If "NO" is determined in the step S183, that is, if the content of the attack cannot be held, the process proceeds to a step S197. On the other hand, if "YES" is determined in the step S183, that is, if the content of the attack can be held, the content of the attack corresponding to this attack operation is held in a step S185, and the process proceeds to the step S197. In the step S185, the processor 81 adds the contents of attack corresponding to this attack operation to the held data 854f as the content of the next attack.

Moreover, if "NO" is determined in the step S177, that is, if there is no attack operation, it is determined, in a step S187, whether there is a further operation. Here, the processor 81 determines whether data indicating that the operation button 33, the operation button 35, the operation button 36 or the ZR-button 61 is depressed is included in the operation data detected at step S3. Here, the further operation means an operation that changes the type of the offensive character 210 and an operation that makes the offensive character 210 retreat from the battle with the enemy character 204.

If "YES" is determined in the step S187, that is, if there is a further operation, processing according to the further operation is started in a step S189, and the process proceeds to the step S193. On the other hand, if "NO" is determined in the step S187, that is, if there is no further operation, the offensive character 210 is moved in a direction that the analog stick 32 is tilted in a step S191, and the process proceeds to the step S193. However, when the analog stick 32 is not tilted, the offensive character 210 is not moved in the step S191 (i.e., a moving amount=0 (zero)).

As shown in FIG. 26, in the step S193, it is determined whether it is during an operation for the offensive character 210. Here, the processor 81 determines whether the offensive character 210 is made to move, perform an attack, or retreat. If "YES" is determined in the step S193, that is, if it is during an operation for the offensive character 210, the process proceeds to a step S199. On the other hand, if "NO" is determined in the step S193, that is, if it is not during an operation for the offensive character 210, it is determined, in a step S195, whether the enemy character 204 is being locked-on.

If "YES" is determined in the step S195, that is, if the enemy character 204 is being locked-on, in a step S197, the position of the virtual camera 250 is set so as to capture the player character 202, the offensive character 210 and the enemy character 204 in the direction of the fourth predetermined direction in the camera coordinate system, and then, the process returns to the game processing. As described above, in the step S197, the position of the virtual camera 250 is set so that the position of the look-at-point is the third predetermined position, and the third predetermined position and the intermediate position between the reference point of the enemy character 204 and the reference point of the character 210, that is, the fourth predetermined position can be captured in the center.

On the other hand, if "NO" is determined in the step S195, that is, if the enemy character 204 is not being locked-on, the position of the look-at-point is set to the second predetermined position in the step S199, and it is determined, in a step S201, whether the distance between the virtual camera 250 and the offensive character 210 is the fourth predetermined distance (for example, 20 (twenty) meters) or more.

If "YES" is determined in the step S201, that is, if the distance between the virtual camera 250 and the offensive character 210 is the fourth predetermined distance or more, the distance between the virtual camera 250 and player character 202 is changed so as to become the sixth predetermined distance (for example, 2 (two) meters), and the process proceeds to a step S211. In the step S203, the processor 81 brings the virtual camera 250 close to the offensive character 210 gradually so that the horizontal distance with the player character 202 becomes the sixth predetermined distance.

On the other hand, if "NO" is determined in the step S201, that is, if the distance between the virtual camera 250 and the offensive character 210 is the fourth predetermined distance or lesser, it is determined, in a step S205, whether the distance of the virtual camera 250 and the offensive character 210 is the fifth predetermined distance (for example, 5 (five) meters) or lesser.

If "YES" is determined in the step S205, that is, if the distance between the virtual camera 250 and the offensive character 210 is the fifth predetermined distance or lesser, the distance between the virtual camera 250 and the player character 202 is changed so as to become the seventh predetermined distance in a step S207, and the process proceeds to a step S211. In the step 207, the processor 81 keeps away the virtual camera 250 from the offensive character 210 gradually so that the horizontal distance with the player character 202 becomes the seventh predetermined distance.

On the other hand, if "NO" is determined in the step S205, that is, if the distance between the virtual camera 250 and the offensive character 210 is the fourth predetermined distance or more, in a step S209, the distance between the virtual camera 250 and the player character 202 is maintained at the first predetermined distance or changed so as to become the first predetermined distance, and the process proceeds to a step S211.

Then, in the step S211, the position of the virtual camera 250 is set so as to capture the offensive character 210 in the front in a direction of the third predetermined direction in the camera coordinate system, and the process returns to the game processing.

In addition, in the step S211, the position of the virtual camera 250 is set at the distance with the player character 202 (i.e., horizontal distance) maintained or changed in the step S203, S207 or S209.

Figure 27:
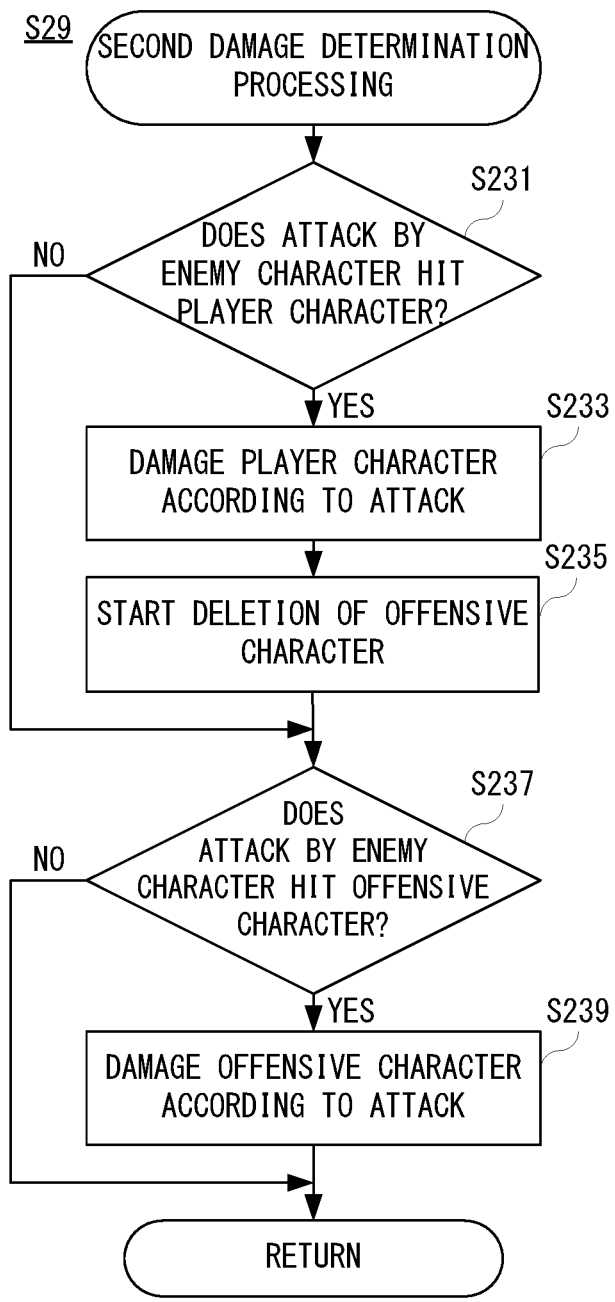
FIG. 27 is a flowchart showing non-limiting example second damage determination processing of the processor of the main body apparatus shown in FIG. 6.

FIG. 27 is a flowchart showing non-limiting example of second damage determination processing of the step S29 shown in FIG. 19. As shown in FIG. 27, if starting the second damage determination processing, the processor 81 determines, in a step S231, whether an attack of the enemy character 204 hits the player character 202. If "YES" is determined in the step S231, that is, if the attack of the enemy character 204 hits the player character 202, the player character 202 is damaged according to the attack in a step S233, and deletion of the offensive character 210 is started in a step S235, and the process proceeds to a step S237. On the other hand, if "NO" is determined in the step S231, that is, if the attack of the enemy character 204 does no hit the player character 202, the process proceeds to the step S237.

In the step S237, it is determined whether the attack of the enemy character 204 hits the offensive character 210. If "YES" is determined in the step S237, that is, if the attack of the enemy character 204 hits the offensive character 210, the offensive character 210 is damaged according to the attack in a step S239, and the process returns to the game processing. On the other hand, if "NO" is determined in the step S237, that is, if the attack of the enemy character 204 does not hit the offensive character 210, the process returns to the game processing.

According to this embodiment, when making the offensive character appear, the movement of the player character by an operation of the player is restricted, and the virtual camera is controlled so as to capture the player character and the offensive character, and when not making the offensive character appear, the movement and the action of the player character are controlled by an operation of the player, and the virtual camera is controlled to follow the player character, and accordingly, it is possible to operate while changing the player character and the offensive character, and to control the virtual camera so as to make both the characters come into the field of view. That is, it is possible to operate the two character objects with a new method.

Moreover, according to this embodiment, even when operating the offensive character, both the player character and the offensive character can be captured, it is possible for the player to recognize that the player character is manipulating the offensive character by the game image. Therefore, it is possible to obtain the feeling of manipulating the offensive character through the player character.

In addition, the offensive character is made to appear when depressing a predetermined operation button, and when releasing the same button, the offensive character is deleted; however, it does not need to be limited to this. When the offensive character is made to appear when the first predetermined operation button is depressed, and when the first predetermined operation button or the second predetermined operation button is depressed next, the offensive character may be deleted.

Moreover, although the game system 1 is used as an example of the game system in this embodiment, its structure or configuration is not to be limited, and therefore, other structure or configuration can be adopted. For example, in the above-described embodiment, the above-described "computer" is a single computer (specifically, the processor 81), but it may be a plurality of computers in other embodiments. The above-described "computer" may be a plurality of computers provided in a plurality of apparatuses, for example, and more specifically, the above-described "computer" may be constituted by the processor 81 of the main body apparatus 2 and the communication control sections (microprocessors) 101 and 111 provided on the controllers.

Furthermore, in this embodiment, a server on a network such as the internet may execute the game processing shown in FIG. 18 and FIG. 19. In such a case, the processor 81 of the main body apparatus 2 transmits the operation data received from the left controller 3 and the right controller 4 to the above-described server via the network communication section 82 and the network, receives a result of execution of the game processing by the server (i.e., game image data and the game sound data), thereby displaying the game image on the display 12 and outputting the game sound from the speaker 88. That is, it is possible to constitute the game system including the game system 1 shown in the above-described embodiment and the server on the network.

Moreover, although a case where the game image is displayed on the display 12 is described in the above-described embodiment, it does not need to be limited to this. The game image can be displayed also on a stationary monitor (for example, television monitor) by connecting the main body apparatus 2 to the stationary monitor via a cradle. In such a case, it is possible to constitute the game system including the game system 1 and the stationary monitor.

Furthermore, although this embodiment is described on a case where the game system 1 having structure that the left controller 3 and the right controller 4 are attachable to or detachable from the main body apparatus 2 is used, it does not need to be limited to this. For example, it is possible to use a game apparatus including the main body apparatus 2 integrally provided with an operation portion having operation buttons and analog sticks similar to those of the left controller 3 and the right controller 4, or a game apparatus such as further electronic equipment capable of executing a game program. The further electronic equipment corresponds to smartphones, tablet PCs or the like. In such a case, an operation portion may constitute with software keys.

Furthermore, specific numeral values and images shown in the above-described embodiment are mere examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer-readable storage medium storing a game program executable by a computer provided with one or more processors, wherein the game program causes the one or more processors to execute:
   in a first operation mode,
      controlling a movement and an action of a player character object in a virtual space based on an operation input;
      setting positions of a viewpoint and a look-at-point of a virtual camera based on a position of the player character object; and
      making an offensive character object appear in the virtual space and changing an operation mode to a second operation mode based on a first changing instruction input, and
   in the second operation mode,
      restricting the movement of the player character object;
      controlling a movement and an action of the offensive character object in the virtual space based on an operation input;
      setting the position of the look-at-point of the virtual camera based on a position of the player character object and setting the position of the viewpoint of the virtual camera so that a line of sight of the virtual camera follows a position of the offensive character object; and
      changing the operation mode to the first operation mode based on a second changing instruction input.

2. The storage medium according to claim 1, wherein the game program causes the one or more processors to execute:
   in the second operation mode,
      making the offensive character object execute a designated action that is designated based on an operation input;
      changing the operation mode to the first operation mode and deleting the offensive character object when the second changing instruction input is performed; and
      deleting the offensive character object when completing the designated action after the operation mode is changed to the first operation mode if the designated action has not been completed by the offensive character object when the second changing instruction input is performed.

3. The storage medium according to claim 2, wherein the game program causes the one or more processors to execute:
   in the second operation mode, when an action is further designated based on an operation input during when the offensive character object is performing a first action having been designated, holding such a designated action as a second action;

making the offensive character object perform the second action after completion of the first action; and deleting the offensive character object when completing all the designated actions having been designated after the operation mode is changed to the first operation mode if at least one of the designated actions is not completed by the offensive character object when the second changing instruction input is performed.

4. The storage medium according to claim 1, wherein the game program causes the one or more processors to execute:

in the first operation mode, making the player character object perform a designated action that is designated based on an operation input; and making the player character object perform the designated action until completing the designated action after the operation mode is changed to the second operation mode if the player character object has not completed the designated action when the first changing instruction input is performed.

5. The storage medium according to claim 1, wherein the game program causes the one or more processors to execute: controlling an enemy character object in the virtual space; and in the second operation mode, deleting the offensive character object when the player character object receives an attack of the enemy character object in the second operation mode and changing the operation mode to the first operation mode.

6. The storage medium according to claim 5, wherein the game program causes the one or more processors to execute: in the second operation mode, setting the position of the viewpoint of the virtual camera so that the line of sight of the virtual camera follows a position of the enemy character object or a position between the offensive character object and the enemy character object.

7. The storage medium according to claim 1, wherein the game program causes the one or more processors to execute: changing temporarily the line of sight of the virtual camera based on an operation input.

8. The storage medium according to claim 1, wherein the game program causes the one or more processors to execute:

performing the first operation changing instruction input when a predetermined key input is changed to an on state from an off state;

performing the second operation changing instruction input when the predetermined key input is changed to the off state from the on state; and making the operation mode continue the second operation mode during a time that the on state of the predetermined key input is continued.

9. A game system provided with an operation device and a game apparatus including one or more processors, wherein the one of more processors execute:

in a first operation mode, controlling a movement and an action of a player character object in a virtual space based on an operation input to the operation device;

setting positions of a viewpoint and a look-at-point of a virtual camera based on a position of the player character object; and making an offensive character object appear in the virtual space and changing an operation mode to a second operation mode based on a first changing instruction input to the operation device, and in the second operation mode, restricting the movement of the player character object;

controlling a movement and an action of the offensive character object in the virtual space based on an operation input to the operation device;

setting the position of the look-at-point of the virtual camera based on a position of the player character object and setting the position of the viewpoint of the virtual camera so that a line of sight of the virtual camera follows a position of the offensive character object; and changing the operation mode to the first operation mode based on a second changing instruction input to the operation device.

10. The game system according to claim 9, wherein the one or more processors to execute:

in the second operation mode, making the offensive character object execute a designated action that is designated based on an operation input;

changing the operation mode to the first operation mode and deleting the offensive character object when the second changing instruction input is performed; and deleting the offensive character object when completing the designated action after the operation mode is changed to the first operation mode if the designated action has not been completed by the offensive character object when the second changing instruction input is performed.

11. The game system according to claim 10, wherein the one or more processors to execute:

in the second operation mode, when an action is further designated based on an operation input during when the offensive character object is performing a first action having been designated, holding such a designated action as a second action;

making the offensive character object perform the second action after completion of the first action; and deleting the offensive character object when completing all the designated actions being designated after the operation mode is changed to the first operation mode if at least one of the designated actions is not completed by the offensive character object when the second changing instruction input is performed.

12. The game system according to claim 9, wherein the one or more processors to execute:

in the first operation mode, making the player character object perform a designated action that is designated based on an operation input; and making the player character object perform the designated action until completing the designated action after the operation mode is changed to the second operation mode if the player character object has not completed the designated action when the first changing instruction input is performed.

13. The game system according to claim 9, wherein the one or more processors to execute: controlling an enemy character object in the virtual space; and in the second operation mode, deleting the offensive character object when the player character object receives an attack of the enemy character object in the second operation mode; and
changing the operation mode to the first operation mode.

14. The game system according to claim 13, wherein the one or more processors to execute: in the second operation mode, setting the position of the viewpoint of the virtual camera so that the line of sight of the virtual camera follows a position of the enemy character object or a position between the offensive character object and the enemy character object.

15. The game system according to claim 9, wherein the one or more processors to execute: changing temporarily the line of sight of the virtual camera based on an operation input.

16. The game system according to claim 9, wherein the one or more processors to execute:
  performing the first operation changing instruction input when a predetermined key input is changed to an on state from an off state;
  performing the second operation changing instruction input when the predetermined key input is changed to the off state from the on state; and
  making the operation mode continue the second operation mode during a time that the on state of the predetermined key input is continued.

17. A game apparatus provided with an operation device and one or more processors, wherein the one or more processors execute:
  in a first operation mode,
    controlling a movement and an action of a player character object in a virtual space based on an operation input to the operation device;
    setting positions of a viewpoint and a look-at-point of a virtual camera based on a position of the player character object; and
    making an offensive character object appear in the virtual space and changing an operation mode to a second operation mode based on a first changing instruction input to the operation device, and
  in the second operation mode,
    restricting the movement of the player character object;
    controlling a movement and an action of the offensive character object in the virtual space based on an operation input to the operation device;
    setting the position of the look-at-point of the virtual camera based on a position of the player character object and setting the position of the viewpoint of the virtual camera so that a line of sight of the virtual camera follows a position of the offensive character object; and
    changing the operation mode to the first operation mode based on a second changing instruction input to the operation device.

18. The game apparatus according to claim 17, wherein the one or more processors to execute:
  in the second operation mode,
    making the offensive character object execute a designated action that is designated based on an operation input;
    changing the operation mode to the first operation mode and deleting the offensive character object when the second changing instruction input is performed; and
    deleting the offensive character object when completing the designated action after the operation mode is changed to the first operation mode if the designated action has not been completed by the offensive character object when the second changing instruction input is performed.

19. The game apparatus according to claim 18, wherein the one or more processors to execute:
  in the second operation mode,
    when an action is further designated based on an operation input during when the offensive character object is performing a first action having been designated, holding such a designated action as a second action;
    making the offensive character object perform the second action after completion of the first action; and
    deleting the offensive character object when completing all the designated actions being designated after the operation mode is changed to the first operation mode if at least one of the designated actions is not completed by the offensive character object when the second changing instruction input is performed.

20. The game apparatus according to claim 17, wherein the one or more processors to execute:
  in the first operation mode,
    making the player character object perform a designated action that is designated based on an operation input; and
    making the player character object perform the designated action until completing the designated action after the operation mode is changed to the second operation mode if the player character object has not completed the designated action when the first changing instruction input is performed.

21. The game apparatus according to claim 17, wherein the one or more processors to execute: controlling an enemy character object in the virtual space; and
  in the second operation mode,
    deleting the offensive character object when the player character object receives an attack of the enemy character object in the second operation mode; and
    changing the operation mode to the first operation mode.

22. A game control method in a game apparatus including one or more processors, wherein the one or more processors execute:
  in a first operation mode,
    controlling a movement and an action of a player character object in a virtual space based on an operation input;
    setting positions of a viewpoint and a look-at-point of a virtual camera based on a position of the player character object; and
    making an offensive character object appear in the virtual space and changing an operation mode to a second operation mode based on a first changing instruction input, and
  in a second operation mode,
    restricting the movement of the player character object;
    controlling a movement and an action of the offensive character object in the virtual space based on an operation input;
    setting the position of the look-at-point of the virtual camera based on a position of the player character object and setting the position of the viewpoint of the virtual camera so that a line of sight of the virtual camera follows a position of the offensive character object; and changing the operation mode to the first operation mode based on a second changing instruction input.

23. The game control method according to claim 22, wherein the one or more processors to execute:

in the second operation mode,
   making the offensive character object execute a designated action that is designated based on an operation input;
   changing the operation mode to the first operation mode and deleting the offensive character object when the second changing instruction input is performed; and
   deleting the offensive character object when completing the designated action after the operation mode is changed to the first operation mode if the designated action has not been completed by the offensive character object when the second changing instruction input is performed.

24. The game control method according to claim 23, wherein the one or more processors to execute:

in the second operation mode,
   when an action is further designated based on an operation input during when the offensive character object is performing a first action having been designated, holding such a designated action as a second action;
   making the offensive character object perform the second action after completion of the first action; and
   deleting the offensive character object when completing all the designated the designated actions being designated after the operation mode is changed to the first operation mode if at least one of the designated actions is not completed by the offensive character object when the second changing instruction input is performed.

25. The game control method according to claim 22 wherein the one or more processors to execute:

in the first operation mode,
   making the player character object perform a designated action in the first operation mode; and
   making the player character object perform the designated action until completing the designated action after the operation mode is changed to the second operation mode if the player character object has not completed the designated action when the first changing instruction input is performed.

26. The game control method according to claim 22, wherein the one or more processors to execute: controlling an enemy character object in the virtual space; and in the second operation mode,
   deleting the offensive character object when the player character object receives an attack of the enemy character object in the second operation mode; and
   changing the operation mode to the first operation mode.

* * * * *